(12) United States Patent
Yu

(10) Patent No.: US 10,380,854 B1
(45) Date of Patent: Aug. 13, 2019

(54) AUTOMATED SMART DOORBELL DEVICE AND METHOD

(71) Applicant: Chengfu Yu, Irvine, CA (US)

(72) Inventor: Chengfu Yu, Irvine, CA (US)

( * ) Notice: Subject to any disclaimer, the term of this patent is extended or adjusted under 35 U.S.C. 154(b) by 0 days.

(21) Appl. No.: 15/818,275

(22) Filed: Nov. 20, 2017

(51) Int. Cl.
*G08B 13/196* (2006.01)
*G10L 17/00* (2013.01)
*G06K 9/00* (2006.01)
*G08B 13/24* (2006.01)

(52) U.S. Cl.
CPC ... *G08B 13/19602* (2013.01); *G06K 9/00228* (2013.01); *G08B 13/2494* (2013.01); *G10L 17/005* (2013.01)

(58) Field of Classification Search
CPC ...... G08B 25/008; G08B 13/08; G08B 13/22; G08B 15/002; G08B 13/00; G08B 13/1672; G08B 13/19632; G08B 13/1966; G08B 13/19684; G08B 13/19695; G08B 13/2491; G08B 19/00; G08B 19/005; G08B 21/22; G08B 25/009; G08B 25/10; G08B 25/14; G08B 29/188; G08B 31/00; G08B 3/10; H04N 7/186
USPC ................................. 340/565, 541, 540, 500
See application file for complete search history.

(56) References Cited

U.S. PATENT DOCUMENTS

| | | | | |
|---|---|---|---|---|
| 9,353,965 | B1 * | 5/2016 | Goyal | G06F 3/011 |
| 2007/0103542 | A1 * | 5/2007 | Carter | H04N 7/142 |
| | | | | 348/14.06 |
| 2008/0129498 | A1 * | 6/2008 | Howarter | G08B 3/10 |
| | | | | 340/541 |
| 2014/0266669 | A1 * | 9/2014 | Fadell | G05B 19/042 |
| | | | | 340/501 |
| 2015/0022618 | A1 * | 1/2015 | Siminoff | H04N 7/186 |
| | | | | 348/14.02 |
| 2015/0228167 | A1 * | 8/2015 | Scalisi | G08B 3/10 |
| | | | | 340/326 |
| 2015/0363989 | A1 * | 12/2015 | Scalisi | G07C 9/00904 |
| | | | | 348/143 |
| 2016/0189502 | A1 * | 6/2016 | Johnson | G07C 9/00571 |
| | | | | 348/155 |
| 2016/0337614 | A1 * | 11/2016 | Siminoff | H04M 11/025 |
| 2018/0048688 | A1 * | 2/2018 | Siminoff | H04N 7/147 |

* cited by examiner

*Primary Examiner* — Emily C Terrell
(74) *Attorney, Agent, or Firm* — Arman Khosraviani

(57) ABSTRACT

An automated smart doorbell (ASD) device having at least one memory, one or more sensors, for detecting a first activity within a first zone and a second activity within a second zone, a processor, coupled to the at least one memory and configured to cause a first action upon detecting the first activity within the first zone, a second action upon detecting the second activity within the second zone, the second action occurring when the second activity occurs following the first activity and within a predetermined amount of time.

30 Claims, 9 Drawing Sheets

AUTOMATED SMART DOORBELL DEVICE AND METHOD

CROSS-REFERENCE TO RELATED APPLICATIONS

The entire contents of the following applications are incorporated herein by reference: U.S. Nonprovisional patent application Ser. No. 15/386,670; filed on Dec. 21, 2016; and entitled AUTONOMOUS PAIRING OF INTERNET OF THINGS DEVICES. U.S. Nonprovisional patent application Ser. No. 15/454,446; filed on Mar. 9, 2017; and entitled DUAL VIDEO SIGNAL MONITORING AND MANAGEMENT OF A PERSONAL INTERNET PROTOCOL SURVEILLANCE CAMERA. Nonprovisional patent application Ser. No. 15/488,211 filed on Apr. 14, 2017; and entitled AN INTERACTIVE AUGMENTED-REALITY IoT DEVICES SYSTEMS AND METHODS. Nonprovisional patent application Ser. No. 15/490,826 filed on Apr. 18, 2017; and entitled GARAGE DOOR CONTROLLER AND MONITORING SYSTEM AND METHOD. Nonprovisional patent application Ser. No. 15/620,749 filed on Jun. 12, 2017; and entitled SMART REGISTER DEVICE AND METHOD. Nonprovisional patent application Ser. No. 15/625,601 filed on Jun. 16, 2017, and entitled SMART FAN AND VENTILATION DEVICE AND METHOD. Nonprovisional patent application Ser. No. 15/680,146 filed on Aug. 17, 2017; and entitled DETERMINING A COMMUNICATION LANGUAGE FOR INTERNET OF THINGS DEVICES. Nonprovisional patent application Ser. No. 15/703,718 tiled on Jun. 5, 2017; and entitled AUTONOMOUS AND REMOTE PAIRING OF INTERNET OF THINGS DEVICES UTILIZING A CLOUD SERVICE II.

FIELD

The present disclosure generally relates to monitoring and controlling a door, a doorbell, or a door lock, and more particularly, to monitoring an entry door, and monitoring and controlling a door lock and smart devices near an entryway to a building.

BACKGROUND

Currently, doorbell security systems are limited in providing a seamless user experience for monitoring visitors and notifying homeowners of such visitors. In some cases, installing the doorbell security system in the existing location of a doorbell severely limits monitoring approaching visitors. Moreover, either numerous unwanted motion triggers and mobile user notifications are created because the doorbell security system sensors are too sensitive to detected motion, or no triggers and mobile user notifications are created because the doorbell security system is not sensitive enough to detect people or other activity.

Further, the push button on many doorbell security systems may crack, jam, break, or simply stop functioning, The push button on these doorbell security systems may be unnecessary for users who receives video, audio, and notifications on their computing device of each visitor or detected motion before the visitor rings the doorbell.

Therefore, there is a desire for users to have a doorbell system seamlessly integrated into their existing buildings or homes. Users may benefit from an automated, cost effective, and convenient control of entryway monitoring, and smart device integration within their building or home.

SUMMARY

The disclosed subject matter relates to an Automated Smart Doorbell (hereinafter, "ASD") device and method. The ASD device having at least one memory, one or more sensors, for detecting a first activity within a first zone and a. second activity within a second zone, a processor, coupled to the at least one memory, the processor is configured to cause a first action upon detecting the first activity within the first zone, a second action upon detecting the second activity within the second zone, wherein the second action occurs when the second activity occurs consecutive to the first activity within a predetermined amount of time.

The first zone and the second zone being generated by, for example, the ASD device or defined by a user, the first activity and the second activity include the presence of one or more sensed activity detected by the one or more sensors, the first action comprises of collecting at least one of a visual information and an audio information within the first zone and the second zone, and the second action is at least one of ringing a doorbell chime, sending a notification to a remote computing device, sending visual information or sending audio information.

The ASD device may include a network module for communicably coupling to a local area network wherein the ASD device is communicably coupled to at least one of a remote computing device or a server. The ASD device may further include one or more sensors, the one or more sensors being one off speaker, a microphone, a camera, or a motion sensor, temperature sensor, humidity sensor, and wind sensor, and wherein the one or more sensors enable image recognition technology or voice recognition technology.

Following the first action, the ASD device may send a notification alert, the visual information, and the audio information to, for example, the remote computing device. The visual in and the audio information may be analyzed prior to executing the second action, and the visual information and the audio information enables facial recognition technology and voice recognition technology.

The ASD device may use a combination of facial recognition technology, voice recognition technology and an ability to adjust the sensitivity of the one or more sensors to discriminate between the presence of a human being and other living beings in the first zone and the second zone and wherein the discrimination determines the occurrence of the second action.

The disclosed subject matter further relates to a method of detecting, by an automated smart doorbell device (ASD), a first activity within a first zone and responsive to the detecting of the first activity performing a first action, detecting, by the ASD, a second activity within a second zone and responsive to the detecting of the second activity performing a second action, where the second action occurs when the second activity occurs consecutive to the first activity within a predetermined amount of time.

The first zone and the second zone being generated by, for example, the ASD device or defined by a user, the first activity and the second activity include the presence of one or more sensed activity detected by the one or more sensors, the first action comprises of collecting at least one of a visual information and an audio information within the first zone and the second zone, and the second action is at least one of ringing a doorbell chime, sending a notification to a remote computing device, sending visual information or sending audio information.

The ASD device may further include one or more sensors, the one or more sensors being one of a speaker, a microphone, a camera, or a motion sensor, temperature sensor, humidity sensor, and wind sensor, and wherein the one or more sensors enable image recognition technology or voice recognition technology.

Following, the first action, the method may send a notification alert, the visual information, and the audio information to, for example, the remote computing device. The visual information and the audio information may be analyzed prior to executing the second action, and the visual information and the audio information enables facial recognition technology and voice recognition technology.

The method may use a combination of facial recognition technology, voice recognition technology and an ability to adjust the sensitivity of the one or more sensors to discriminate between the presence of a human being and other living beings in the first zone and the second zone and wherein the discrimination determines the occurrence of the second action.

The disclosed subject matter further relates to a non-transitory machine-readable medium comprising instructions stored therein, which, when executed by one or more processors of a processing system cause the one or More processors to perform operations comprising detecting, by an automated smart doorbell device (ASD), a first activity within a first zone, and responsive to the detecting of the first activity performing a first action, detecting, by the ASD, a second activity within a second zone and responsive to the detecting of the second activity performing a second action, where the second action occurs when the second activity occurs consecutive to the first activity within a predetermined amount of time.

The first zone and the second zone being generated by, for example, the ASD device or defined by a user, the first activity and the second activity include the presence of one or more sensed activity detected by the one or more sensors, the first action comprises of collecting at least one of a visual information and an audio information within the first zone and the second zone, and the second action is at least one of ringing a doorbell chime, sending a notification to a remote computing device, sending visual information or sending audio information.

The ASD device may further include one or more sensors, the one or more sensors being one of a speaker, a microphone, a camera, or a motion sensor, temperature sensor, humidity sensor, and wind sensor, and wherein the one or more sensors enable image recognition technology or voice recognition technology.

Following the first action, the non-transitory machine-readable medium method may send a notification alert, the visual information, and the audio information to, for example, the remote computing device. The visual information and the audio information may be analyzed prior to executing the second action, and the visual information and the audio information enables facial recognition technology and voice recognition technology.

The non-transitory machine-readable medium where the ASD device may use a combination of facial recognition technology, voice recognition technology and an ability to adjust the sensitivity of the one or more sensors to discriminate between the presence of a human being and other living beings in the first zone and the second zone and wherein the discrimination determines the occurrence of the second action.

It is understood that other configurations of the present disclosure will become readily apparent to those skilled in the art from the following detailed description, wherein various configurations of the present disclosure are shown and described by way of illustration. As will be realized, the present disclosure of other different configurations and its several details are capable of modifications in various other respects, all without departing from the subject technology. Accordingly, the drawings and the detailed description are to be regarded as illustrative in nature and not restrictive.

BRIEF DESCRIPTION OF THE DRAWINGS

Certain features of the present disclosure are set forth in the appended claims. However, for purpose of explanation, several implementations of the present disclosure are set forth in the following figures.

Figure 1:
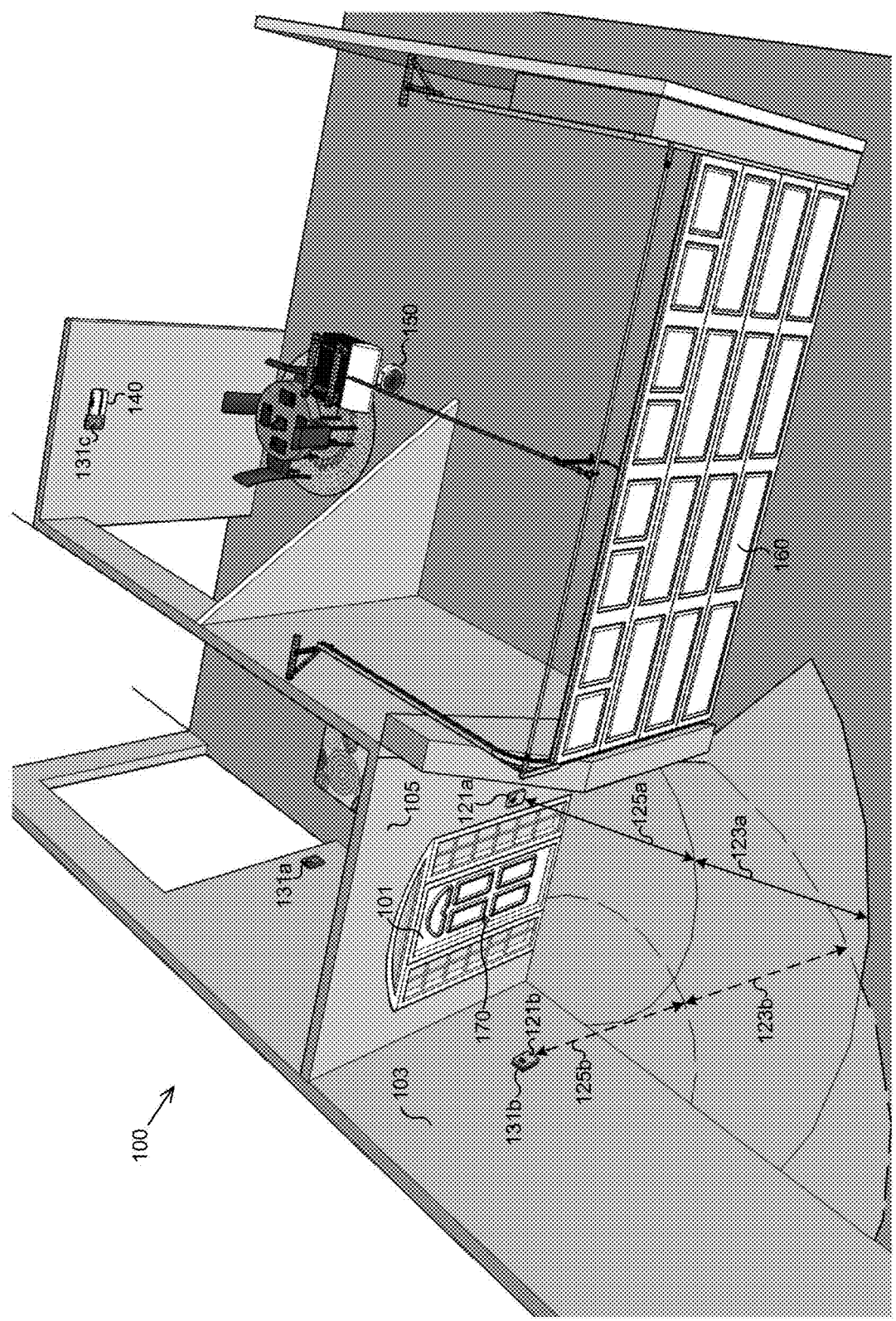
FIG. 1 illustrates an exemplary Smart Doorbell device being implemented in accordance with one or more exemplary embodiments of the present disclosure.

Embodiments of the present disclosure and their advantages are best understood by referring to the detailed description that follows. It should be appreciated that like-reference-numerals are used to identify like-elements illustrated in one or more of the figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

Various features of the present disclosure will now be described, and is not intended to be limited to the exemplary embodiments shown herein. Modifications to these features and exemplary embodiments will be readily apparent to those skilled in the art, and the principles defined herein may be applied to other exemplary embodiments without departing from the scope of the disclosure.

FIG. 1 illustrates exemplary embodiments of implementing a Smart Doorbell 121a or Smart Doorbell 121b of the present disclosure in a building 100. The Smart Doorbell 121a or 121b may be installed on one or more walls 103, 105 of building 100 and positioned near one or more entry doors 101. The Smart Doorbell 121a or 121b may be a new install using new or existing electrical wiring, or may replace an existing doorbell and use existing wiring from the previous doorbell. Moreover, the Smart Doorbell 121a or 121b may be installed and positioned on a pedestal, column, or any type of masonry or freestanding structure within the property boundaries of building 100.

Figure 4:
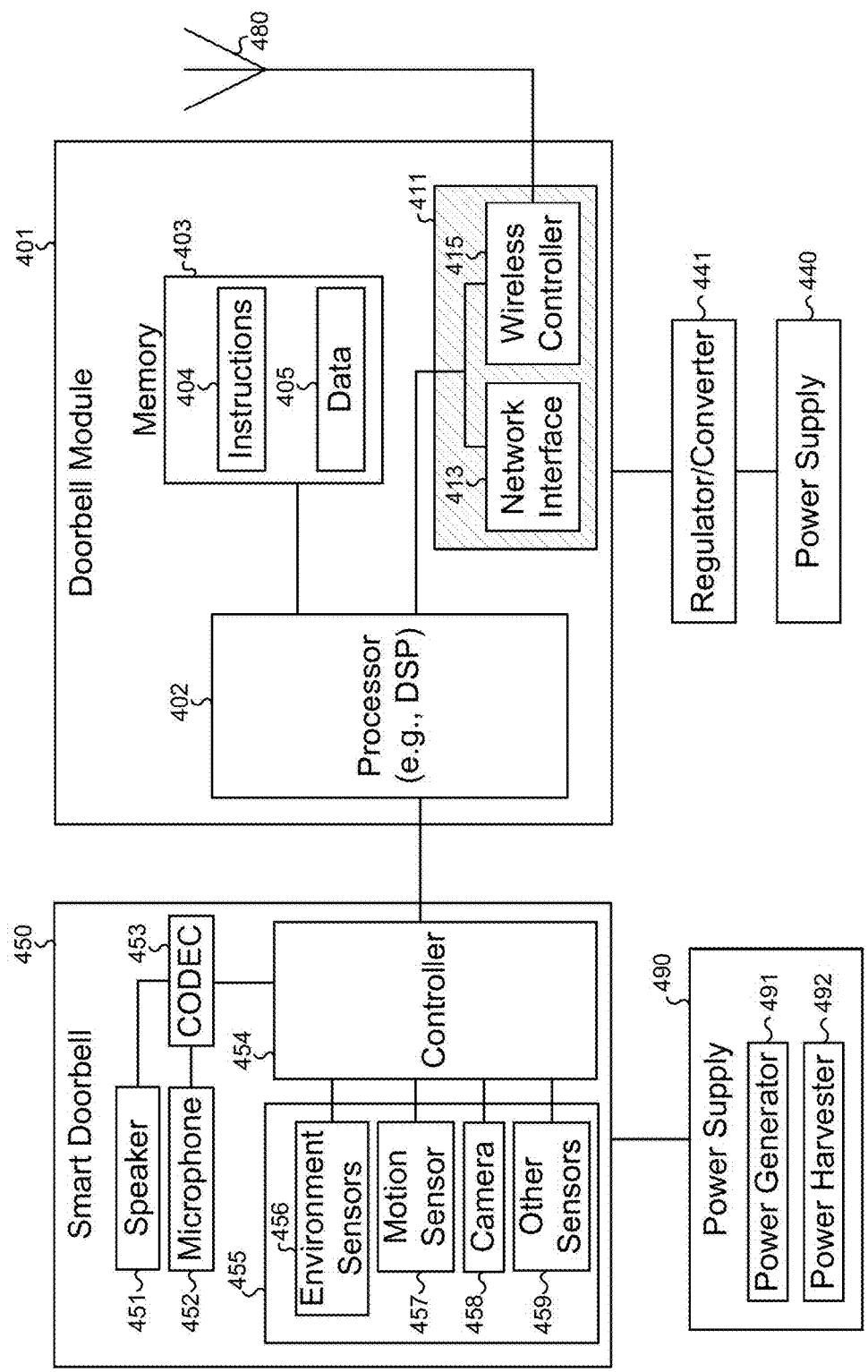
FIG. 4 illustrates an exemplary embodiment of the internal components of the Smart Doorbell device in accordance with one or more exemplary embodiments of the present disclosure.

In some exemplary embodiments, as further described in FIG. 4, the Smart Doorbell 121a or 121b may function as a sensor device (e.g. Smart Doorbell 221) in communication with other local electronic devices (e.g. doorbell module 231, smart lock 270, and garage door controller and monitoring unit 250) comprising only sensor components 225 and minimal software, firmware, and hardware (e.g. camera 223, microphone 229, and speaker 227). Alternatively, in some exemplary embodiments the Smart Doorbell 121a or 121b may be comprehensive monitoring solution comprising software, firmware, a processor, memory, a network module, one or more sensors and controllers, a user interface or control panel, one or more batteries, one or more power connectors or ports, power supply adapter, etc. In some embodiments, the Smart Doorbell 121a or 121b may be a wireless device to facilitate, for example, easier installation and optimal installation locations. The Smart Doorbell 121a or 121b may include various sensor components for detecting motion, sound, ambient lighting, weather conditions, temperature, pressure, objects, etc.

When triggered to operate, the Smart Doorbell 121a or 121b may play a digital or analog chime, ring the manual doorbell chime 140, send a notification, and/or communicate the detected motion, sound, temperature, etc., to a doorbell module 401, local electronic device 541, remote computing device 531, or server 511, or any combination thereof for further processing collected environmental activity.

As shown in FIG. 1, the Smart Doorbell 121a is installed at a first exemplary installation location along wall 105, and may monitor activity in one or more defined regions, zones, or areas around building 100, including but not by way of limitation, a first zone 123a defined at a first distance from the Smart Doorbell 121a, and a second zone 125a defined at a second distance from the Smart Doorbell 121a. The first zone 123a includes a disc positioned around the circumference of the second zone 125a, the second zone 125a forms an area that is substantially a semi-circle. First zone 123a and second zone 125a may be viewed as area/region overlays defined on a live image or live video of an area around building 100 as acquired by the sensors of the Smart Doorbell 121a. The first zone 123a and/or second zone 125a may make up a part of, or the entirety of, the area(s) acquired by the sensors of the Smart Doorbell 121a. The zones 123a and 125a may be defined by a user or computing device (e.g. server 202) by using a Human-to-Machine Interface (HMI) for the Smart Doorbell 121a. The zones 123a and 125a may define areas for collecting and/or filtering out activity using sensors (e.g. camera 223) of the Smart Doorbell 121a.

The length of the first distance and the length of the second distance may be substantially different as shown in FIG. 1, or the first and second lengths may be equal or substantially equal. For example, the disc of the first zone 123a may instead be a semi-circle completely overlapping the second zone 125a. As another example, the lateral length of the disc of the first zone 123a may be equal to the radius of the semi-circle of the second zone 125a. The monitoring areas defined by first zone 123a and second zone 125a need not be limited to a circle or disc as shown in FIG. 1, the monitoring areas may be a square, triangle, rectangle, decagon, dodecagon, icosahedron, or the like. Further, a user may create additional zones, one or more monitoring areas within the zones, or individually adjust each monitoring area(s). The user may define the shape or area of zones by positioning any number of vertices of a polygon or n-gon to define the monitoring area for the first zone 123 and the second zone 125.

Similarly, a Smart Doorbell 121b having a second exemplary installation location along wall 103 may monitor activity in one or more defined regions, zones, or areas around building 100, including but not by way of limitation, a third zone 123b defined at a third distance from the Smart Doorbell 121b, and a fourth zone 125b defined at a fourth distance from the Smart Doorbell 121b. The third zone 123b and fourth zone 125b of the Smart Doorbell 121b may be similarly configured as described above for the first zone 123a and second zone 125a of Smart Doorbell 121a.

FIG. 1 further illustrates exemplary embodiments of doorbell modules 131a, 131b, and 131c (hereafter "doorbell module 131") communicably coupled to the Smart Doorbell 121a or 121b (hereafter "Smart Doorbell 121"). In some embodiments, the doorbell module 131 (e.g. 131b) may be directly coupled to or integrated with the Smart Doorbell 121 (e.g. 121b). The Smart Doorbell 121b and doorbell module 131b may then be electrically connected or hardwired to the doorbell chime 140. The Smart Doorbell 121 and doorbell module 131 may also be wirelessly connected to a doorbell chime 140 through an adapter or dongle (not shown) that operates doorbell chime 140.

In some embodiments, the, doorbell module 131 (e.g. 131c) may be electrically coupled to the Smart Doorbell 121 (e.g. 121a) and to the doorbell chime 140 through existing electrical wiring. In some exemplary embodiments, the doorbell module 131 (e.g. 131a) may be electrically connected to or wirelessly coupled to Smart Doorbell 121 (e.g. 121a). Similarly, doorbell module 131 and Smart Doorbell 121 may then be electrically connected to or wirelessly connected to the doorbell chime 140.

The doorbell module 131 may include software, firmware, and hardware for processing signals transmitted by the Smart Doorbell 121. As further described in FIG. 4, the doorbell module 131 may include a processor, memory, a network module, one or more sensors and controllers, a user interface or control panel, one or more batteries, one or more power connectors or ports, power supply adapter, etc. In some exemplary embodiments, the user accesses the doorbell module 131 directly to configure the Smart Doorbell 121. In some exemplary embodiments, the Smart Doorbell 121 and doorbell module 131 may share the function of processing monitored activity and may adjust monitoring schedules, schemes, or routines based on time of day, detected activity, user input and preferences.

The Smart Doorbell 121 and/or doorbell module 131 may include sensors and programming to detect and record specific monitoring activity to filter out or block from being sent to a user. For example, the Smart Doorbell 121 and/or doorbell module 131 may prompt a user through the user's wireless user device 531 on whether to continue monitoring an area or region based collected activity, and update the monitoring conditions according to user input or preferences. Additionally, the doorbell module 131 may include motion sensors, a speaker and microphone to detect whether user(s) open the entry door 101 to momentarily leave their home (e.g. to get something from the car, or get the mail). In such a case, and when the Smart Doorbell 121 is functioning as a passive device, the doorbell module 131 may instruct the Smart Doorbell 121 not to automatically play a digital or analog chime and/or ring the manual doorbell chime 140. Instead, the Smart Doorbell 121 may collect video of the user(s) leaving and entering their home. The Smart Doorbell 121 may also use the user input or preference to communicate with other computing devices (e.g. doorbell module 231, smart lock 270, and garage door controller and monitoring unit 250) on the user's status (e.g. Home, Away, etc.).

The Smart Doorbell 121 and/or doorbell module 131 may use image recognition, GPS, geofencing, or user input to create one or more zones (e.g. zones 123a, 123b) as an initial triggering region(s) and one or more zones (e.g. zones 125a, 125b) as a subsequent triggering region(s). Activity in zones 123a, 123b, 125a, 125b, positioned a predefined distance from the Smart Doorbell 121a, exterior walls 103, 105, or entry door 101, triggers the Smart Doorbell 121 and/or doorbell module 131 to operate by, for example, playing a digital or analog chime, ringing the manual doorbell chime 140 sending a notification, and/or communicating the detected motion, sound, temperature, etc., to a computing device (e.g. local electronic devices 541, and remote computing devices 531, server 511, etc.,) for further processing.

Figure 5:
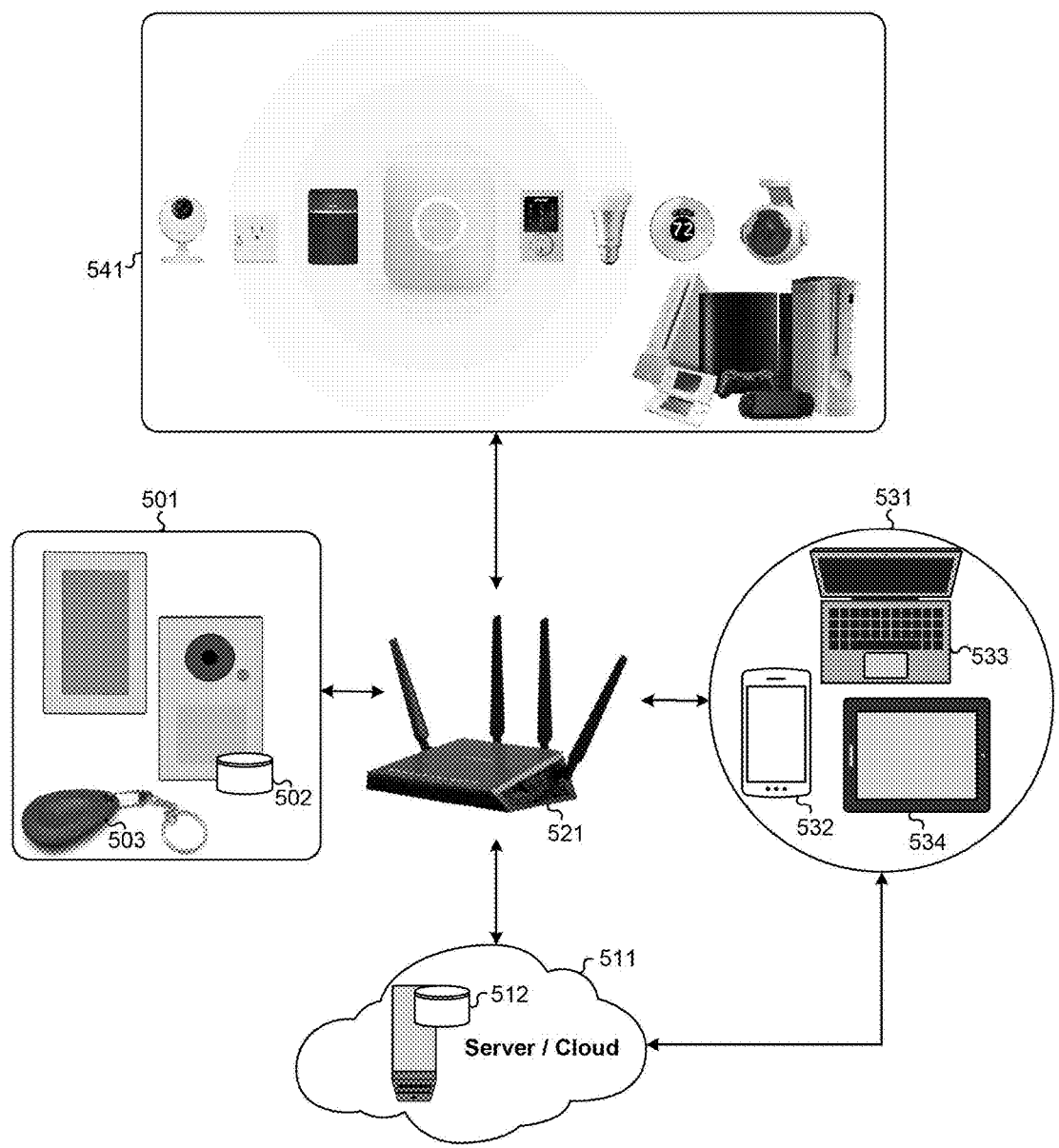
FIG. 5 illustrates an exemplary embodiment of the Smart Doorbell device communicating with other smart devices or remote computing devices in accordance with one or more exemplary embodiments of the present disclosure.

The Smart Doorbell 121, doorbell module 131, local electronic devices 541 in building 100, remote computing devices 531, or one or more servers 511 (as shown in FIG. 5) may create or process one or more activity monitoring regions, zones, or areas around building 100, The activity monitoring regions, zones, or areas around building 100 may comprise of for example, a first zone 123a, a second zone 125a, a third zone 123b, or a fourth zone 125b thereafter "zone 123" and "zone 125"). The Smart Doorbell 121 may monitor for activity in zone 123 and zone 125, and collect data to send to a computing device (e.g. doorbell module 131) for further processing.

Any number of activities (hereafter "environmental activity") may trigger the Smart Doorbell 121 to collect data about that environmental activity, for example, the presence of motion or sound, presence or absence of remote computing devices 531 (as shown in FIG. 5), interactions between user(s) and local electronic devices 541 in building 100, changes in ambient lighting land local weather, and certain types of sound or motion, opening of a garage door 160 or smart lock 140, etc. The Smart Doorbell 121 may monitor and collect environmental activities based on, environmental activity triggers defined by Smart Doorbell 121 and/or doorbell module 131. The Smart Doorbell 121 and/or doorbell module 131 may operate autonomously or semi-autonomously to define one or more monitoring zone regions, zones, or areas around building 100, and/or to define one or more environmental activity for monitoring by the Smart Doorbell 121 by using detected objects, user preferences or input, or voice or image recognition from the Smart Doorbell 121 sensors (e.g. camera 223 and microphone 229).

The Smart Doorbell 121 and/or doorbell module 131 may further be communicably coupled to a smart lock 170, garage door controller and monitoring unit 150, and doorbell chime 140. The garage door controller and monitoring unit 150 may receive control signals, from local electronic devices 541 in building 100, remote computing devices 531, or one or more servers 511, and may communicate with Smart Doorbell 121 and/or doorbell module 131 and smart lock 170. Thus, entry points (e.g. entry door 101 and garage door 160) to building 100 may be selectively monitored and controlled using a combination of information collected by the garage door controller and monitoring unit 150, Smart Doorbell 121, doorbell module 131, smart lock 170, etc., and notifications therefrom may be communicated amongst the devices listed above and local electronic devices 541 in building 100, remote computing devices 531, or one or more servers 511. Users may be notified to provide selective access to entry points to building 100 for any detected individual, and individuals leaving and entering building 100 may be monitored.

The Smart Doorbell 121 and/or doorbell, module 131 may include voice and image recognition software or hardware to process facial features and voice signatures, prior to sending to a server 511 for further processing. Features of homeowners or specific individuals may also be stored on the Smart Doorbell 121 and/or doorbell module 131 to prevent ringing digital doorbell chime of the Smart Doorbell 121 and doorbell chime 140. Moreover, these features may be used to authenticate the individuals' rights to access to a smart lock 170 to automatically open the entry door 101 when such individuals enter one or more zones (e.g. zone 123 or zone 125).

The Smart Doorbell 121 may further collect any visually distinguishable feature of the individual such as facial features, infrared/heat signatures, etc. The collected visual, motion, and audio information may be used by the processor 402 and/or controller 454 to determine the individual(s). The processor 402 and/or controller 454 may send the collected visual, motion, and audio information to the server 511 for further processing, monitoring, and visual analytics. The individual's visual information may comprise of facial features for facial recognition (e.g. appearance of nose, eyes, ears, etc.), body type and shape, height, skin color, hair color, clothing type, shoes, socks, etc. The individual's information may also comprise of a portion of portions of the head, arms, legs, feet, torso, etc. Any of the individual's visual information may be used to determine or define the individual. The processed motion and visual information (e.g. facial recognition) may be used by the doorbell module 131 or server 511 to select from a list of voice messages for communicating with the individual(s). For example, communication may comprise of a means to guide or interact with a visitor, a post office worker, a delivery person, a neighbor, etc.

Thus, there may exist one or more types of triggers for the Smart Doorbell 121 to monitor; environmental activity triggers that define any type of activity collected from the Smart Doorbell 121 sensors, and zone triggers that define regions for monitoring for activity by the Smart Doorbell 121 sensors. However, the Smart Doorbell 121 monitoring need not be constrained by either of the two types of triggers, the Smart Doorbell 121 may, for example, monitor environmental activity outside of zone 123 and zone 125.

Upon detecting environmental activity around building 100, the Smart Doorbell 121 may collect audio, video, temperature, humidity, ambient lighting, etc. In some exemplary embodiments, the Smart Doorbell 121 collects all environmental activity inside and outside zones 123 and 125, that is, all environmental features (e.g. presence of motion) and all environmental conditions (e.g. changes in ambient lighting). In some exemplary embodiments, the Smart Doorbell 121 collects only environmental activities defined by a user or another electronic or computing device, for example, local electronic devices 541 in building 100, a remote computing devices 531, or one or more servers 511 (as shown in FIG. 5).

For example, an individual or object crossing zone 123 may trigger the Smart Doorbell 121 to start collecting audio and video or images of the user or object. The individual or object crossing zone 125 within a predetermined or predefined period of time may trigger the Smart Doorbell 121 to play a digital or analog chime, ring the manual doorbell chime 140, send a notification, and/or communicate the detected motion, sound, temperature, etc., to a doorbell module 401, electronic device 541, remote computing device 531, or server 511, or any combination thereof for further processing collected environmental activity. The user, Smart Doorbell 121, the doorbell module 401, the electronic device 541, the remote computing device 531, or the server 511, or any combination thereof may be used for determining and/or defining the predetermined or predefined period of time for triggering the actions above (e.g. sending a notification, and/or communicating detected motion, video, sound, temperature, etc.,). Additionally, the visual information and the audio information collected by the Smart Doorbell 121 and/or doorbell module 401 may be used for voice recognition technology and image recognition technology to prevent unnecessary notification (video, audio, text, etc.,), video collection, and audio collection.

Moreover, the combination of facial recognition technology, voice recognition technology and an ability to adjust the sensitivity of the one or more sensors may be utilized by the user, Smart Doorbell 121, and/or the doorbell module 401 to define and/or discriminate between the presence of human beings, moving objects, and other living beings in zone 123 and zone 125. Once a human being is determined by the Smart Doorbell 121 and/or the doorbell module 401 to be present, the second action may take place. Once moving objects or other living beings are determined by the Smart Doorbell 121 and/or the doorbell module 401 to be present, another action may take place or no action may take place. Also, the second action may take place on the condition that the user defines or accepts a human being or human activity as collected by the Smart Doorbell 121 and/or the doorbell module 401. Thus, in some exemplary embodiments, the Smart Doorbell 121 and/or the doorbell module 401 may be used to discriminate between the presence of human beings, moving objects, and other living beings (e.g. environmental activity) in the first zone and the second zone, and upon determining the occurrence of an environmental activity a second action or other action may be taken as appropriate. The ordering of first action, second action, third action, etc., should not be limited to the trivial sense, for example, the second action may come before the first action or fourth action.

In some exemplary embodiments, if the individual or object first crosses zone 125 then zone 123, the Smart Doorbell 121 may be configured to ignore the event. In some exemplary embodiments, if the individual or object first crosses zone 125 then zone 123, and then at a later time crosses zone 123 and then zone 125 the Smart Doorbell 121 may be configured to ignore the event, use example, voice or image recognition technology to determine to ignore the event, and/or use user input to determine to ignore the event, or any combination thereof. The Smart Doorbell 121 may also be configured to request an action from a doorbell module 401, a user, a local electronic device 541, remote computing device 531, or server 511, or any combination thereof for handling the event in future occurrences. In some exemplary embodiments, if the individual or object first crosses zone 123 then zone 125 within a predetermined amount of time, the Smart Doorbell 121 and/or doorbell module 401 may be configured to perform one or more actions. Moreover, prior to performing a second action, the Smart Doorbell 121 and/or doorbell module 401 may perform one or more actions to verify the environmental activity (e.g. human activity) through, for example, voice or image recognition technology.

When triggered to operate, the Smart Doorbell 121*a* or 121*b* may play a digital or analog chime, ring the manual doorbell chime 140, send a notification, and/or communicate the detected motion, sound, temperature, etc., to a doorbell module 401, local electronic device 541, remote computing device 531, or server 511, or any combination thereof for further processing collected environmental activity.

The Smart Doorbell 121 and/or doorbell module 131 may further process the collected environmental activity around building 100. Upon processing the collected data (e.g. video, audio, sensed environmental conditions) about the environmental activity, the Smart Doorbell 121 and/or doorbell module 131 may determine whether to transmit the collected environmental activity to a user as a video clip, a text message, an email, or a voice or sound message. The Smart Doorbell 121 and/or doorbell module 131 may also decide to ignore the environmental activity, to delay repotting the environmental activity, or to not report the environmental activity to a user.

Moreover, local electronic devices 541 in building 100, remote computing devices 531, or one or more servers 511 may create environmental activity triggers or process collected environmental activity triggers in one or more defined regions, zones, or areas around building 100 of, for example, zone 123 and zone 125, to send to a user (e.g. wireless user device 532). Local electronic devices 541 in building 100, remote computing devices 531, or one or more servers 511 may prompt the user to monitor other areas for environmental activity or prompt the user to ignore the area for environmental activity.

In some exemplary embodiments, the Smart Doorbell 121 may further process the collected data of the environmental activity. The Smart Doorbell 121 may, process the collected data in part or in whole, before sending the collected data to the doorbell module 131, local electronic devices 541 in building 100, a remote computing devices 531, or one or more servers 511 (as shown in FIG. 5) for further processing. Further, the Smart Doorbell 121 may instead process some or all environmental conditions and selectively transmit environmental conditions information to the doorbell module 131.

Figure 2:
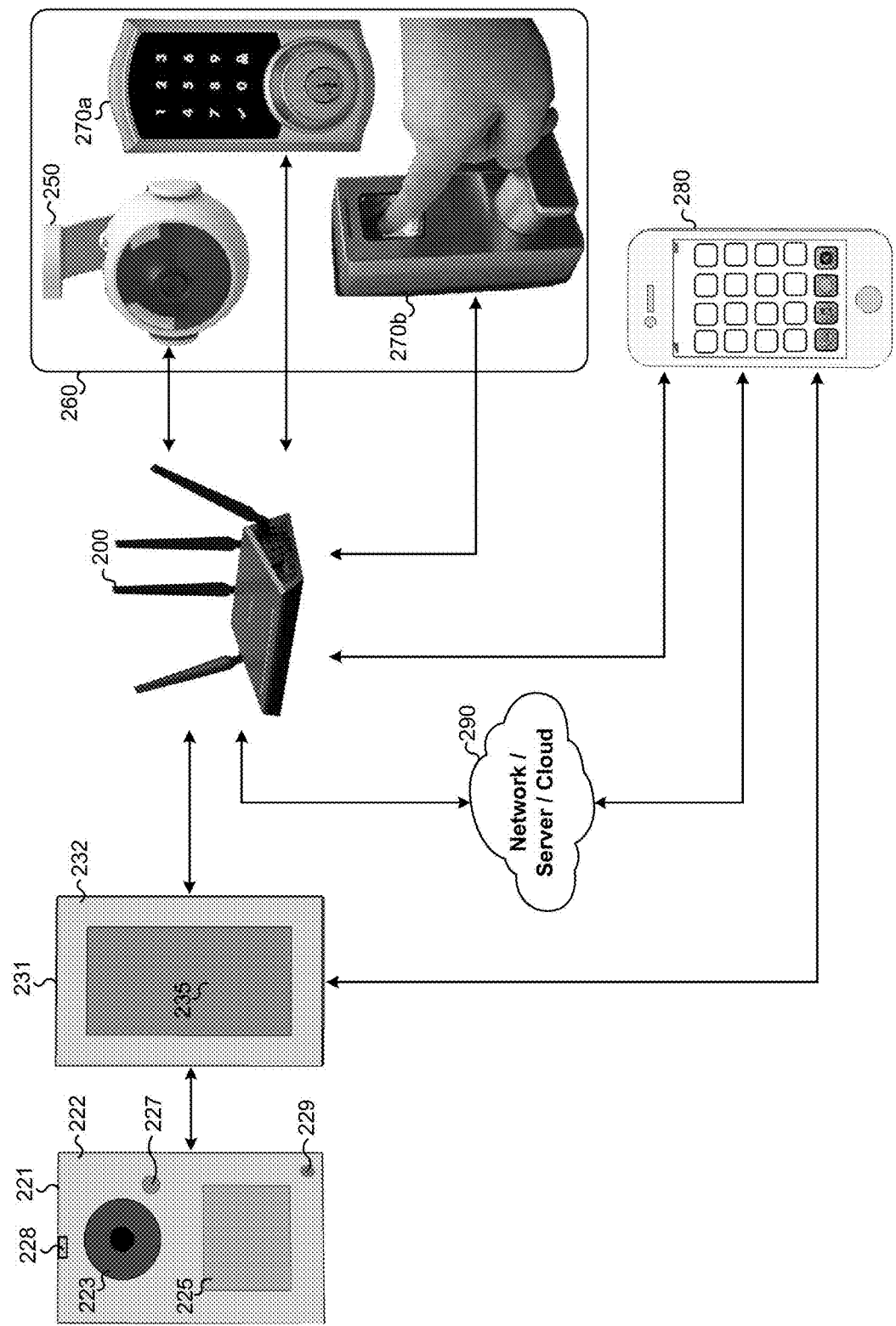
FIG. 2 illustrates an exemplary embodiment of the Smart Doorbell device and doorbell module communicating with other entry point devices, wireless access points, or remote computing devices in accordance with one or more exemplary embodiments of the present disclosure.

FIG. 2 illustrates an exemplary embodiment of implementing Smart Doorbell 221 and doorbell module 231 of the present disclosure with some exemplary entry point devices 260, for example, garage door controller and monitoring unit 250, smart lock 270*a*, and biometric lock 270*b*, and the like.

The Smart Doorbell 221 includes a housing 222 that houses one or more cameras 223, one or more panels 225, a speaker 227, and one or more microphones 229. In some embodiments, the Smart Doorbell 221 may include a controller 454 for wirelessly communicating with doorbell module 231.

The panel 225 may include sensor components 450, a mechanical ring button (not shown), and a touch sensitive e.g. resistive, capacitive, optical, surface acoustic wave (SAW), ultrasonic, etc.,) touchpad for detecting fingerprints, finger presses, finger taps, or finger swipes. The panel 225 may be used for operating the digital doorbell chime of Smart Doorbell 221, the doorbell, chime 140, entry point devices 260, local electronic devices 541, and the like.

Alternatively, the Smart Doorbell 221 may include the panel 225 and exclude a ring button. The Smart Doorbell 221 may operate, for example, entry point devices 260 based on detected motion, sound (e.g. voice signature), video (e.g. facial recognition), or any combination thereof.

The panel 225 may complement geofencing (e.g. Wi-Fi and Bluetooth) for authenticating and automating the process of unlocking entry door 101, for example, when the user's wireless device 531 is within a proximity to the entry door 101, pressing the panel 225 may communicate to entry point devices 260 to unlock entry door 101. In some embodiments, the panel 225 may be excluded, and the housing 222 may function as the mechanical button and/or touch sensitive touchpad.

The panel 225 may include a projector (e.g. dot matrix projector) that the user may configure to project onto the floor (e.g. in zone 125) or installation wall (e.g. 103 or 105) a picture, a personalized greeting, or street address number. The projector may also be used to project a keypad onto the installation wall (e.g. 103 or 105) above or below the Smart Doorbell 121 that a guest, individual, or delivery person may enter a one-time security code to unlock art entry point device 260. An additional sensor 228 (e.g. fingerprint or motion sensor) may be attached on the housing 222 to detect finger presses over the projected keypad to detect the code entered, or a fingerprint of a finger pressed on the sensor 228. The sensor 228 may extend up the edge of the housing 222 to cover two adjacent sides of the housing 222 (e.g. the front face and top face of the housing). In some embodiments, the projector may be placed together with or combined with the sensor 228 so that a user can either using their fingerprint or enter a code through the keypad projection to operate an entry point device 260.

Similarly, the doorbell module 231 includes a housing 232 that houses one or more panels 235. As with the panel 225 of the Smart Doorbell 221, the panel 235 may include sensor components 450 to corroborate user(s) or individual(s) presence or activity within building 100 as further described in FIG. 4.

In some exemplary embodiments, the user accesses the doorbell module 231 directly to configure the Smart Doorbell 221 using a Human to Machine Interface (HMI), for example, through firmware or software installed on the Smart Doorbell 221, through software or application installed on a computing device (e.g. remote computing device 531) or through a web interface, or through one or more servers 511 communicably coupled to the doorbell module 231 and/or Smart Doorbell 221.

As an exemplary embodiment, the smart Doorbell 221 may collect data from various environmental activities and zones (e.g. 123, 125) around building 100 and communicate the collected data to a doorbell module 231. The doorbell module 231 may then process the collected data and determine whether a user should be sent a notification, a video, an audio, a prompt to continue or cease monitoring specific activity, live view access, recorded video access, etc.

The Smart Doorbell 221 and/or doorbell module 231 may be communicably coupled to, for example and not limited to, one or more wireless user devices 280 through a router 200, one or more servers 290, or a peer-to-peer (P2P) connection. The Smart Doorbell 221 and doorbell module 231 may further be communicably coupled to one or more local electronic devices 541 in building 100 through a hardwired or wireless network connection (e.g. through router 200).

The Smart Doorbell 221 and/or doorbell module 231 may each include a communication module 413 and/or wireless controller 415 to communicably couple an electronic device 541, entry point device 260, or the like, to a wired or wireless network, P2P network, etc.

The Smart Doorbell 221 and/or doorbell module 231 may send notifications or send user authorization through a server 511, however, audio and or video may be sent by the doorbell module 231 or Smart Doorbell 221 through a peer-to-peer (P2P) network. The doorbell module 231 or Smart Doorbell 221 may connect directly to the user's remote computing device 531 or indirectly through a P2P coordinator using a wireless intermediate scheme such as radio frequency (RF), microwave, and the like. Those skilled in the art will recognize the doorbell module 231 or Smart Doorbell 221 may indirectly connect to the remote computing device 531 through multiple relay nodes such as access points, base stations, hubs, bridges, routers or other communication devices, not shown.

If a user acknowledges the event, the HMI may bring up the Smart Doorbell 221 system application. The application may then connect directly to the doorbell module 231 and/or Smart Doorbell 221 to download (stream) the audio and/or video, to open 1-way or 2-way communication. The user may also be allowed to open the entry door 101 or garage 160 by giving control commands (e.g. lock/unlock or open/close) to the entry point device 260 through, for example, the Smart Doorbell 221 HMI application. A separate secured connection over IP) may be established between the HMI application and the Smart Doorbell 221 or doorbell module 231.

Figure 3A:
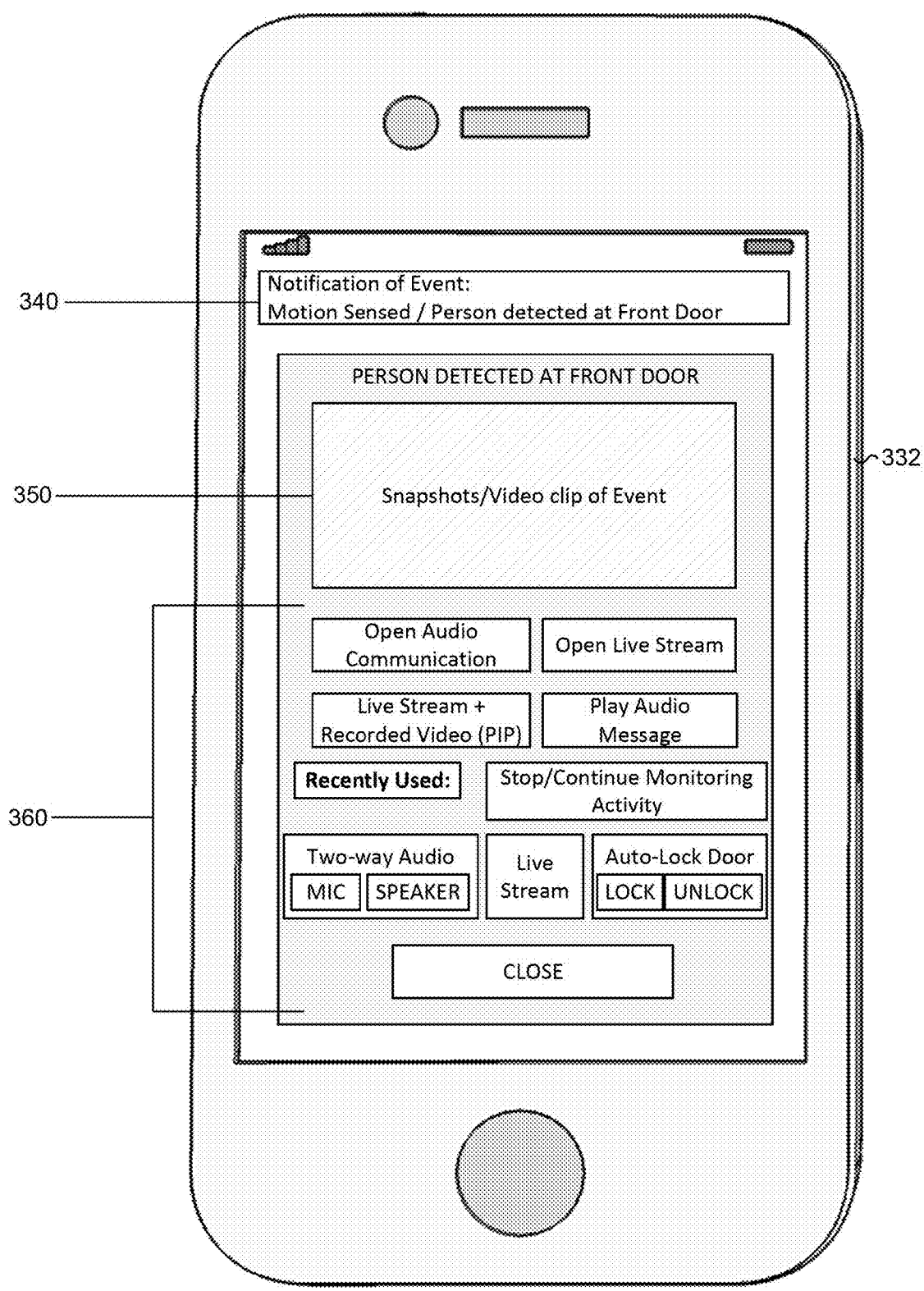
FIGS. 3A-3C illustrates an exemplary user interface of the Smart Doorbell device on a computing device in accordance with one, or more exemplary embodiments of the present disclosure.
Figure 3B:
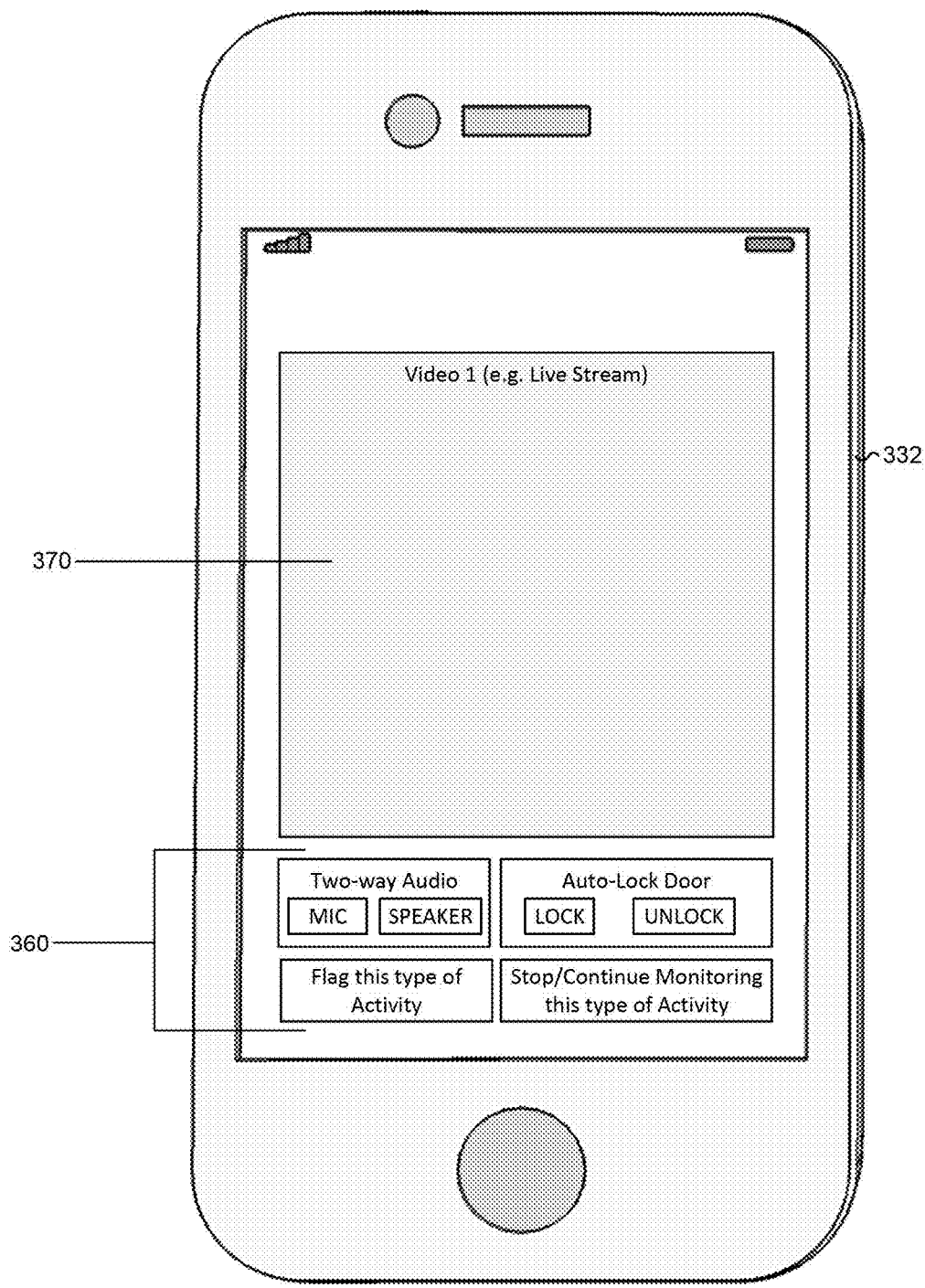
Figure 3C:
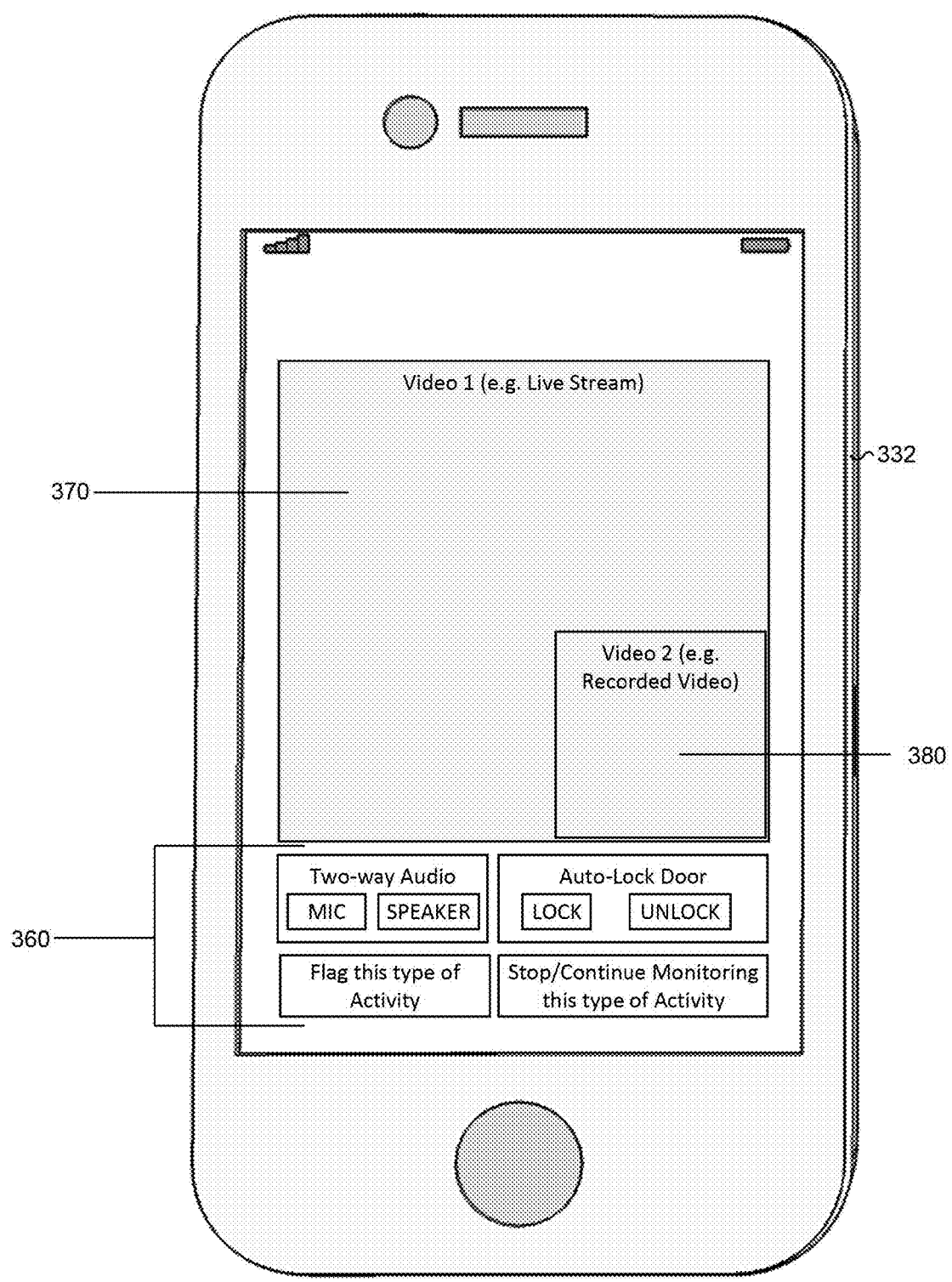

FIGS. 3A-3C illustrates an exemplary user interface HMI application of the Smart Doorbell 221 on a wireless user device 332 in accordance with one or more exemplary embodiments of the present disclosure.

When an environmental activity (e.g. presence of an individual) takes place, an event is detected by the Smart Doorbell 221, a wireless user device 332 displays to the user a notification 340, video clip/snapshots 350 of the event, and prompt 360 to perform a series of actions or no action in response to the event.

The notification 340 may provide the user with a text message describing the event, and the user option to interact with notification 340 (swipe or press on the notification) to a see video clip/snapshots 350 and more details of the event. After interacting with the notification 340, the wireless user device 332 may display video clip/snapshots 350 of the event prior to, or together with, a prompt 360 to perform a series of actions. The video clip/snapshots 350 show a series of snapshots or a brief video of the environmental activity, based on user preferences and connectivity settings defined by the user or wireless user device 3232.

The video clip/snapshots 350 may play automatically upon the user interacting to the notification 340, or may play upon user interaction on the video clip/snapshots 350 (e.g. pressing or swiping on the wireless riser device 332). Upon viewing the video clip/snapshots 350, the user may interact with the prompt 360 to respond with a series of actions and a list of commonly used or recently used actions.

At prompt 360, the user may respond to the detected environmental activity by selecting, for example, open audio communication. By selecting open audio communication on the wireless user device 332, the user may be shown a new live stream window 370, as shown in FIG. 3B, to initiate a live video teleconference with the individual at building 100. Alternatively, selecting open audio communication on the wireless user device 332 may initiate an intercom audio only session with the user, if, for example, the detected individual is known to the user and the user wants to communicate only via an audio session to reduce battery drain or data usage on their wireless user device 332.

At prompt 360, the user may also select to see a live stream window 370 as well as a recorded video window 380 of the event as shown in FIG. 3C. Further, the user may respond to the event by playing a greeting or audio message. The audio message may be predefined or recorded by the individual and stored, for example, on the wireless user device 332, server 511, or doorbell module 231.

The user may also be allowed to open the entry door 101 or garage 160 by giving control commands (e.g. lock/unlock or open/close) to entry point device 260 through, for example, the Smart Doorbell 221 HMI application. A separate secured connection (SSL/TSL over IP) may be established between the HMI application and the Smart Doorbell 221 or doorbell module 231 to operate entry point devices 260.

In FIG. 3D, when the user selects to open a live stream, the HMI application may connect directly to the doorbell module 231 and/or Smart Doorbell 221 to download (stream) the audio and/or video and display in live stream window 370, and to open 1-way or 2-way communication. The user may also be allowed to open the entry door 101 or garage 160 by giving control commands (e.g. lock/unlock or open/close) to the entry point device 260 through, for example, the Smart Doorbell 221 HMI application. A separate secured connection (SSL/TSL over IP) may be established between the HMI application and the Smart Doorbell 221 or doorbell module 231 to operate entry point devices 260.

The user may also be given an option to stop monitoring the detect type of environmental activity (e.g. a car driving past the home, or homeowner entering or leaving the building 100). Alternatively, the user may go to a history list, live view, or recorded video to undo this option to continue monitoring for such environmental activity around the building 100. The user may also choose to flag the environmental activity to be notified when a certain activity occurs within or outside of zone 123 and zone 125.

In FIG. 3C, similar to FIG. 3B, when the user selects Live Stream+Recorded Video (PIP), the HMI application may connect directly to the doorbell module 231 and/or Smart Doorbell 221 to download recorded video of the event to show in recorded video window 370 and to stream the audio and/or video and display in live stream window 370, and to open 1-way or 2-way communication. The user may also be allowed to open the entry door 101 or garage 160 by giving control commands (e.g. lock/unlock or open/close) to the entry point device 260 through, for example, the Smart Doorbell 221 HMI application. A separate secured connection (SSL/TSL over IP) may be established between the HMI application and the Smart Doorbell 221 or doorbell module 231 to operate entry point devices 260.

FIG. 4 illustrates conceptually an exemplary Smart Doorbell device 450 with which some exemplary embodiments of the present disclosure may be implemented. The doorbell module 401 may be any sort of electronic device that transmits signals over a network, such as electronic devices embedded in smart appliances and other smart systems. The doorbell module 401 may include various types of computer readable media (e.g., a non-transitory computer-readable medium) and interfaces for various other types of computer readable media.

Figure 6A:
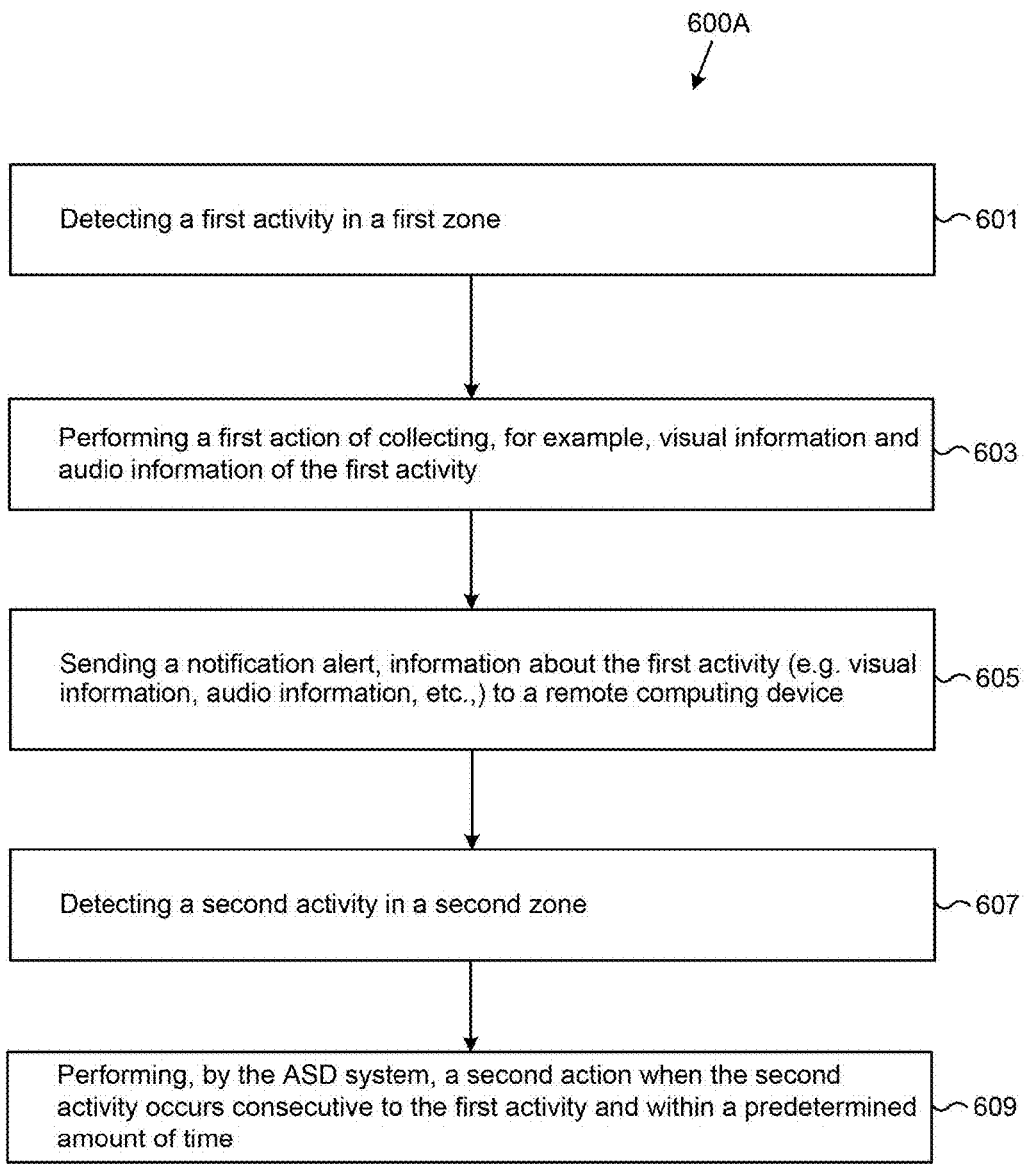
FIG. 6A illustrates an exemplary embodiment of a flowchart of interactions and operations of the Smart Doorbell device in accordance with one or more exemplary embodiments of the present disclosure.
Figure 6B:
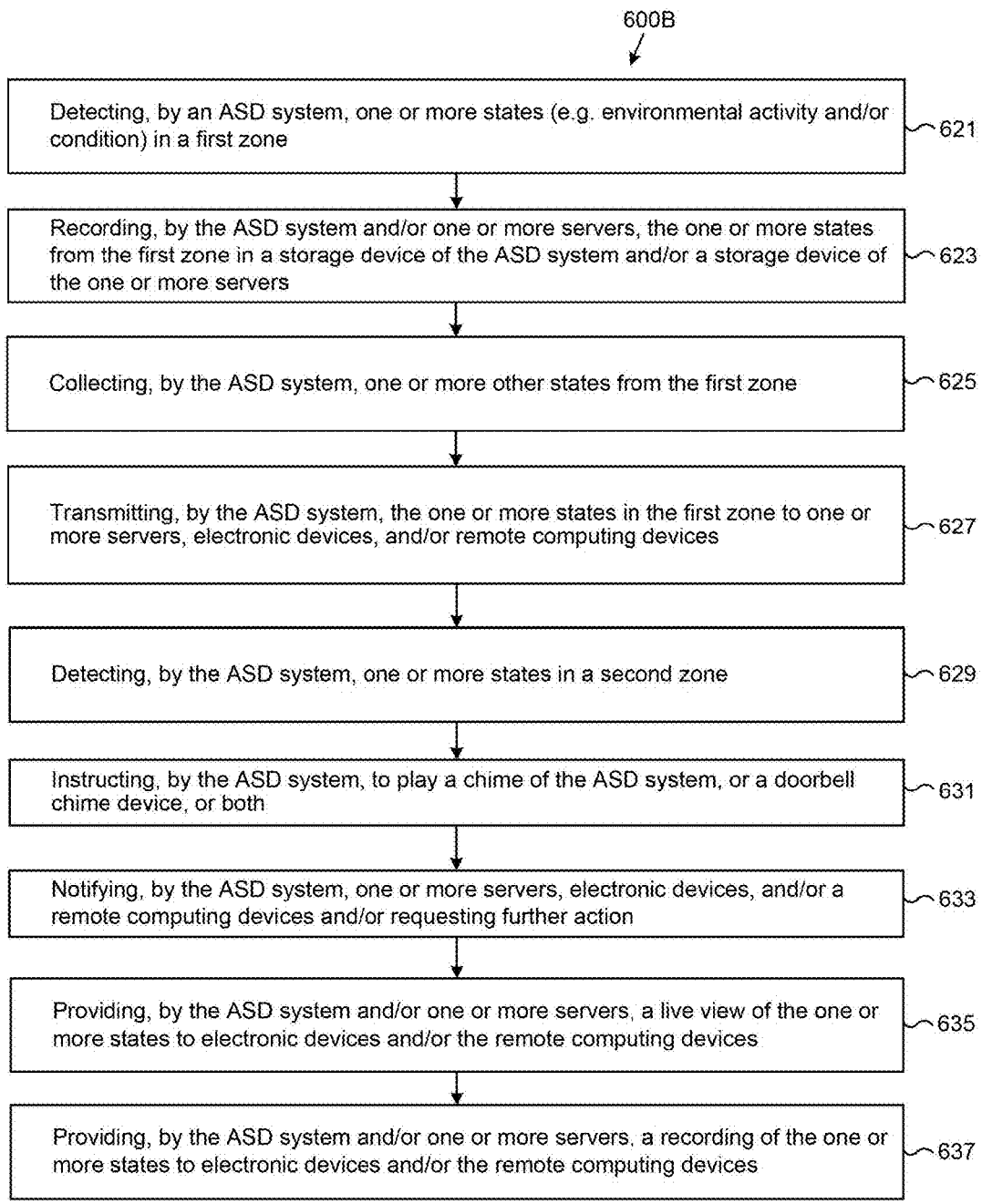
FIG. 6B illustrates an exemplary embodiment of a flowchart of interactions and operations of the Smart Doorbell device in accordance with one or more exemplary embodiments of the present disclosure.

The doorbell module 401 includes a processor 402 and memory/storage 403. The processor 402 may retrieve and execute instructions 404 and/or data 405 from memory/storage 403 to perform the processes of the present disclosure. Processor 402 may be a single processor, a multi-core processor, or multiple processors in different implementations. Referring to FIGS. 4-5, instructions and data for operating doorbell module 401 may be stored on, transmitted from, or received by any computer-readable storage medium (e.g., memory/storage 512 of server 511) storing data (e.g., data 405) that is accessible to a processor (e.g., the processor of server 511) during modes of operation of the doorbell module 401. The doorbell module 401 may access and execute instructions 404 and/or data 405 stored on an remote computing device 531. The data 405 may be a method instruction as depicted in FIGS. 6A-6C. The method instructions are executable by processor 402, one or more servers 511, one or more electronic devices 541, one or more remote computing devices 531, or any combination thereof, where the instructions include steps on configuring and operating the Smart Doorbell 450 and/or doorbell module 401 and communication between user(s) and other remote, local, and/or wireless electronic devices.

The memory/storage 403 may include a dynamic random-access memory (DRAM) and/or a read-only memory (ROM). Memory/storage 403 may provide a temporary location to store data 405 and instructions 404 retrieved and processed by processor 402. Memory/storage 403 may include a non-volatile read-and-write memory that stores data 405 and instructions 404, even when Wi-Fi/Internet is off, that may be retrieved and processed by processor 402. For example, memory/storage 403 may include magnetic, solid state and/or optical media, memory/storage 403 may be a single or multiple memory units as necessary. The memory/storage 403 stores all collected visual, audio, textual, voice, motion, heat, proximity, etc. information provided directly from the Smart Doorbell 450, or indirectly through a wireless connection to another electronic device(s), sensor(s), or sensor module(s) (e.g. local electronic devices 541).

Doorbell module 401 couples to a network through a network. interface 413. In some aspects, network interface 413 is a machine-interface. In this manner, the doorbell module 401 may be a part of a network of computers, a local area network (LAN), a wide area network (WAN), or an Intranet, or a network of networks, for example, the Internet. A wireless controller 415 may be coupled to the processor 402. The wireless controller 415 may be further coupled to an antenna 480. The network module 411 may be integrated as system-in-package or system-on-chip device and/or collectively defined as having the network interface 413 and wireless controller 415. Network interface 413 and wireless controller 415 integrated into the network module 411 and being coupled to an antenna 480. Any or all components of doorbell module 401 may be used in conjunction with the subject disclosure. The network interface 413 may include cellular interfaces, WiFi™ interfaces, Infrared interfaces, RFID interfaces, ZigBee interfaces, Bluetooth interfaces, Ethernet interfaces, coaxial interfaces, optical interlaces, or generally any communication interface that may be used for device communication.

The doorbell module 401 is powered through a power supply 440. The power supply 440 may include disposable and/or rechargeable batteries (e.g. 2800 mAh rechargeable Li-Polymer battery), power through existing wiring of a digital or mechanical doorbell (e.g. existing 8-24 VAC chime systems), a power supply adapter, or any combination thereof. The power supply 440 of doorbell module 401 may also include solar panels/cells or any renewable/alternative power supply source (e.g. wind turbine) as a primary or auxiliary source of power. Moreover, a converter/regulator 441; transformer or voltage regulator, AC to DC or DC to DC power, converter, or frequency converter may be used separately (electrically coupled to the doorbell module 401), or integrated within the doorbell module 401 to provide adequate input power to the doorbell module 401 (e.g. 12 VDC).

A Smart Doorbell 450 may be communicably coupled to the doorbell module 401. The Smart Doorbell 450 may be coupled to doorbell module 401, formed on doorbell module 401, or remotely connected to doorbell module 401. The Smart Doorbell 450 may include and control various sensor components 455 for sensing environmental activity (e.g. temperature, sound, motion, and location of individuals, and their respective changes over time) within a proximity of the building 100. Sensor components 455 may monitor environmental conditions (e.g. humidity, temperature, rainfall) by using one or more environmental sensors 456, and individual activity by using one or more motion sensors 457, other sensors 459, and camera 458 and microphone 452.

A combination of sensor components 455 may be implemented to provide comprehensive monitoring or improved accuracy in monitoring environmental activity. Moreover, individual sensor components from Smart Doorbell 450 may be separately coupled to doorbell module 401, formed on doorbell module 401, or remotely connected to doorbell module 401. In some embodiments, some sensor components 455 may be grouped together to form a second or additional sensor modules. In certain embodiments, some sensor components 455 of Smart Doorbell 450 (e.g. camera 457) may instead be formed on the doorbell module 401. Further, in some embodiments, some sensor components 455 of Smart Doorbell 450 (e.g. camera 457) may also be formed on the doorbell module 401 to provide additional or supplemental monitoring.

Environmental sensors 456 may detect and collect information about environmental conditions around building 100. Environmental sensors 456 may include, for example, temperature sensor, ambient light sensor, humidity sensor, barometer sensor, air quality sensor (e.g. for detecting allergens, gas, pollution, pollen, etc.), infrared sensor, $CO_2$ sensor, CO sensor, piezoelectric sensor, airflow or airspeed sensor, and the like. The environmental conditions collected by environmental sensors 456 may be used by the processor 402 of the doorbell module 401 in determining whether to notify a user (e.g. by wireless user device 532) or operate the Smart Doorbell 450. Environmental sensors 456 may include, for example, a motion sensor, camera, and other sensors (e.g. proximity sensor, occupancy sensor, ambient light sensor). A microphone 452 may also be used to detect features or verify the opening or closing of entry door 101, or presence of individuals, or any type of environmental activity around building 100.

The Smart Doorbell 450 may include a controller 454 for controlling the sensors and processing data collected by the sensors. Controller 454 may include a processor, memory/storage device (storing sensor instructions, settings, etc.), and. a network module wireless chip for communicating with, doorbell module 401. Controller 454 may send measured/detected environmental conditions and features to the processor 402 for further processing. In some embodiments, the Smart Doorbell 450 may exclude the controller 454 and function as a sensor only device that transfers collected environmental activity around building 100 to the doorbell module 401.

In some exemplary embodiments, the Smart Doorbell 450 includes controller 454 to share or divide processing tasks or priorities of video, audio, or environmental sensor data with the doorbell module 401. For example, the controller 454 may process certain motion (e.g. pets or animals, or joggers) or sounds (e.g. neighborhood cars or garage doors opening) instead of (or prior to) sending to doorbell module 401. Similarly, the doorbell module 401 may process environmental activity prior to sending to a sever 511 for further processing if necessary.

The Smart Doorbell 450 may be powered by a power supply 490, The power from the power supply 490 may be provided by disposable and/or rechargeable batteries (e.g. 2800 mAh rechargeable Li-Polymer battery), existing wiring of a digital or mechanical doorbell (e.g. existing 8-24 VAC chime systems), a power supply adapter, or any combination thereof. The Smart Doorbell 121 may also be powered by solar panels/cells or any renewable/alternative power supply source (e.g. wind turbine) as a primary or auxiliary source of power. Disposable batteries or rechargeable batteries, for example, nickel cadmium (NiCd), lithium (Li), AA, AAA, and/or rechargeable capacitors, for example, supercapacitors (SC) or ultracapacitors. The power supply 490 may supply power to Smart Doorbell 450 by, for example, a power adapter for connecting to an outlet, a solar panels/cell, or any other renewable/alternative power supply source. The Smart Doorbell 450 may use multiple battery types, multiple power sources, etc., for example, using a coin cell battery to operate some sensor components or to provide auxiliary power.

In addition to being connected to existing wiring of a digital or mechanical doorbell (e.g. existing 8-24 VAC chime systems), the Smart Doorbell 450 may include a power generator 491 and power harvester 492 as a power source. The power generator 491 may include rechargeable batteries, for example, nickel cadmium (NiCd), lithium (Li), AA, AAA, and/or rechargeable capacitors, for example, supercapacitors (SC) or ultracapacitors. The power generator 491 may comprise of multiple battery types, for example, using a coin cell battery to operate some sensor components or to provide auxiliary power, while using existing wiring to provide power for the Smart Doorbell 450. Moreover, the power supply 490 may include a power harvester 492 such as wind turbines/electric generator or solar cells/panels for charging rechargeable batteries or capacitors to prolong primary and/or auxiliary power.

The Smart Doorbell 450 may include a speaker 451 and microphone 452 for communicating with an individual or receiving control commands from an individual positioned within a vicinity of the doorbell module 401. The speaker 451 and microphone 452 may be coupled to a CODEC 453. The coder/decoder (CODEC) 453 may also be coupled to the processor 402 through a controller 454. The processor 402 may provide audio information captured from the microphone 452 to any electronic device (e.g. server 511 or wireless user device 532) as shown in FIG. 4, that may facilitate communication with an individual positioned within a vicinity of the doorbell module 401 through the speaker 451.

In an exemplary embodiment, the doorbell module 401 and/or Smart Doorbell 450 comprises one or more motion sensors 457 for detecting motion information. For example, motion sensor 457 may detect moving objects and/or pedestrians. The motion sensor 457 may be a passive infrared motion detector. Infrared motion sensors are also known as PIR (passive infrared) motion sensors or simply PIR sensors. Such detectors have about a 120° are and about a 50-foot range detection zone. In the case where an increased field of view of motion detection or more accurate motion detection is required, two or more motion detectors may be used.

Suitable alternate motion detectors may also be used, such as ultrasonic, optical, microwave, or video motion detectors. Additional alternative, types of motion detectors may also be used to sense intrusion including laser scanning or frequency sensitive detectors, commonly referred to as "glass breaks". Motion sensor 457 may include image sensors having any type of low light level imaging sensors used for surveillance and unmanned monitoring in daylight to complete darkness, for example, low-light complementary metal-oxide-semiconductor (CMOS) or charge-coupled device (CCD) image sensors.

The motion sensor 457 may also be complemented with other devices to aid in detecting motion such as, for example, photocell sensors, cadmium-sulfide (CdS) cells, light-dependent resistors (LDR), and photoresistors. In addition to motion sensors, the photo cell sensors may be used to determine if there something in front of a sensor or a series of sensors that block light. The sensitivity of the motion sensor and photocell may be adjusted through, for example, an application on an electronic device (e.g. smart device 534 or laptop 531). Also, a server or application may decide if the situation or application warrants night use or twenty-four-hour operation of motion detection through alternate means such as photocell sensors. If night operation is selected, then the server or application will process detected photocell information to determine if motion was detected.

The Smart Doorbell 450 may include any number of other or additional detectors or sensors, for example, other sensors 459. Examples of other sensors 459 that may be used include, by way of illustration only and not by way of limitation, temperature sensors, video cameras, audio recorders, motion sensors, ambient light sensors, light sensors, humidity sensors, smoke detectors, and other sensors, such as for example, an Electric Field Proximity Sensing (EFPS) sensor to determine whether a person or object is nearby that is behind a wall.

The Smart Doorbell 450 may include a camera 458 for capturing visual information such as video and still images of the surrounding environment. The camera 458 may be coupled to a controller 454 for controlling the camera to capture visual information that may be sent to the processor 402. The controller 454 may be coupled to the processor 402 for processing visual information. The processor 402 may provide visual information captured from the camera 458 to any electronic device (e.g. server 511 or remote computing device 531) which may facilitate interaction or communication with a person or an object positioned within a vicinity of the doorbell module 401. The camera 458 may be any optical instrument for recording or capturing images that may be stored locally, transmitted to another location, or both. The images may be still photographs, or sequences of images forming videos or movies. The camera 458 may be any type of camera, for example, high-end professional camera type, digital camera, panoramic camera, fish-eye lens type camera, multi-lens type camera, VR camera, etc.

The Smart Doorbell 450 and/or doorbell module 401 may provide an external audio feedback, for example, playing a greeting, audio message, or ringing a doorbell chime through the speaker 451 of the Smart Doorbell 450. Moreover, the Smart Doorbell 450 and/or doorbell module 401 may provide an internal audio feedback, for example, ringing a digital or mechanical doorbell chime 140 located on building 100. The Smart Doorbell 450 and/or doorbell module 401 may communicate with one or more local electronic devices 541, remote computing devices 531, and servers 511 to provide one or more users with remote audio and/or visual feedback.

FIG. 5 illustrates an exemplary embodiment of an Automated Smart Doorbell system 501 (Smart Doorbell 450 and doorbell module 401) (hereafter "ASD system 501"). The ASD system 501 may comprise of smart doorbell 450 and doorbell module 401. In the following exemplary embodiments, the description of the ASD system 501 may refer to one of the devices, for example, the smart doorbell 450 noticing the user of an environmental activity or the doorbell module 401 notifying the user of an environmental activity. Alternatively, the ASD system 501 may refer to the group of devices working together, for example, the smart doorbell 450 working together with notifying the doorbell module 401 to notify the user of an environmental activity.

In some exemplary embodiments, the ASD system 501 may be linked through Wi-Fi, LAN, WAN, Bluetooth, two-way pager, cellular connection, etc., to a transmitter (e.g. more wireless user devices 280, or remote computing device 531). The ASD system 501 may learn user habits, patterns, and behavior by communicating with one or more local electronic devices 541, remote computing devices 531, and servers 511 through, for example, a wireless router 521.

The ASD system 501 may comprise of wirelessly communicating with one or more local electronic devices 541, remote computing devices 531, and servers 511 through, for example, a wireless router 521. The local electronic devices 541 may include, for example, IP cameras, smart outlets, smart switches, smart lightbulbs, smart locks, smart thermostats, video game consoles and smart TVs, smart blinds, garage door monitoring and controlling devices, smart refrigerators, smart washer/dryer, smart devices powered on solar energy, etc. and the like. The ASD system 501 may also connect to laptops 533, portable devices 534, wireless user device 532, and, server 511 and/or server storage 512.

The ASD system 501 may collect, store, and process user habits, patterns, and behavior to predict and/or learn appropriate actions based on user interactions with the ASD system 501, electronic devices 541, remote computing devices 531, and servers 511. For example, the ASD system 501 may collect and process user interactions with, for example, the ASD system 501, server 511, transmitter (e.g. wireless user device 280) status and location, or user(s) interaction with electronic devices 541, or any combination of the above.

The ASD system 501 may communicate user interactions, habits, patterns, and behavior to a server 511, electronic devices 541, remote computing devices 531, or the like for further processing. For example, doorbell module 401 may activate or operate Smart Doorbell 450 at certain times based on scheduling or user interaction to collect and process user interactions, habits, patterns, and behavior.

Moreover, user interactions may be cataloged or stored in one or more databases (e.g. ASD system storage 512, or server storage 512, etc.,) for mapping out user habits, patterns, and behavior to predict and/or learn appropriate actions and responses that may be taken by the ASD system 501, server 511, and/or communicated by the ASD system 501 or server 511 to one or more local electronic devices 541, or remote computing devices 531 for taking one or more appropriate actions.

For example, the ASD system 501 may notify a user of the location of the transmitter when a detected user activity conflicts with the status or location of the transmitter or with the user pattern or habit. The user activity may be collected by the ASD system 501 and/or one or more local electronic devices 541, or remote computing devices 531. For example, the ASD system 501 may notify a user by playing an audio message when the user leaves through the entry door 101 forgetting to take their mobile phone with them in the morning.

In some exemplary embodiments, the ASD system 501 may further provide improved energy efficiency the ASD system 501 the Smart Doorbell 450 of the ASD system 501 may include one or more communication modules for communicating wirelessly (e.g. Bluetooth, Wi-Fi, etc.,) with the doorbell module 401, and/or with one, or more remote computing devices 531, servers 511, local, electronic devices 541, or any other electronic device mentioned above.

Similarly, the doorbell module 401 of the ASD system 501 may include one or more communication modules for communicating wirelessly Bluetooth, etc.,) with the doorbell module 401, and/or with one or more remote computing devices 531, servers 511, local electronic devices 541, or any other electronic device mentioned above.

The one or more communications modules may comprise of, for example, a basic low power communications module to communicate with the Smart doorbell 450 or doorbell module 401, and more robust or higher power communications module to communicate with other electronic devices, connect to the interact, or stream or distribute audio, visual, or motion information through a P2P or direct connection to other electronic devices. The audio/video sent by the Smart Doorbell 450 to the doorbell module 401 may be sent as an uncompressed audio/video file, the doorbell module 401 may then compress the audio/video file and send to a server 511.

The ASD system 501 may include a tamper-proof mechanism that may activate the ASD system 501 camera to record video and stream to one or more remote computing devices 531, servers 511, or local electronic devices 541 when the housing 222 or parts of the housing 222 (e.g. battery cover) is tampered with or damaged, and/or when entry door 101 or windows are broken (e.g. glass break sound detection).

Moreover, the ASD system 501 may include a night LED that may operate based on the time in the time zone of installation to provide better lighting conditions for collecting video at night and/or to provide a convenient night light function in the entryway to the building 100 for the visitor or owner.

In some exemplary embodiments, the Smart Doorbell 450 or doorbell module 401 may temporarily store video in a storage module or ASD system storage 502 when the access point (e.g. router) loses internet connection, or when the ASD system 501 loses network connectivity.

Furthermore, in some exemplary embodiments, the ASD system 501 may be in a normally dormant state (e.g. ECO Mode, Sleep Mode, etc.,). For example, the Smart Doorbell 450 and/or doorbell Module 401 may be off or substantially off (e.g. low power mode) until motion, sound, or press of a ring button triggers, the ASD system 501 to activate. Moreover, in some exemplary embodiments, the housing 222 may include a resistive or capacitive touch sensor and fingerprint sensor formed on or outside of the panel 225 as a manual push button and fingerprint reader.

Once activated the ASD system 501 may attempt to use facial recognition or voice recognition to initiate an and audio or video intercom session. The ASD system 501 will collect the individual conversation or activity at the entry door 101 and send the communication as a live audio or video stream or recorded video clip or audio clip to one or more servers 511, remote computing devices 531, or local electronic devices 541, or any combination thereof. The communication will initiate a video or audio teleconference with a user, using the microphone 451, camera 458, and speaker 452. The video or audio teleconference may be terminated when the individual in front of the entry door 101 leaves, or when the user terminates video or audio teleconference through, for example, an interaction with wireless user device 280 (e.g. finger press, eye motion, or other control command).

The ASD system 501 may be configured to wirelessly communicate and cooperate with local electronic devices 541 in real-time based on collected environmental activity or stored visual, motion, audio, and environmental information in ASD system storage 502 or server storage 512. The processor 402, controller 454, and/or server 511 may operate the Smart Doorbell 450 to play a digital or analog chime, ring the manual doorbell chime 140, or collect environmental activity (e.g. video, audio, temperature, etc.,) to send to a computing device (e.g. doorbell module 401, local electronic devices 541, remote computing devices 531, server 511, etc.,) based on triggered environmental activity or zone triggers as collected by the Smart Doorbell 450.

Other local electronic devices 541 (e.g. security camera, thermostat, smoke detector, smart lock, smart TV, etc.,) may cooperate with or supplement Smart Doorbell 450 sensors to provide comprehensive information of environmental activity around building 100, or one or more zones 123, 125 around building 100. In some exemplary embodiments, the security camera 541 may add additional monitoring (audio or video) information to allow the ASD system 501 to filter out a tenant's activity around a home from ringing the doorbell chime. In some exemplary embodiments, the ASD system 501 may use stored information in ASD system storage 502 or server storage 512 to determine whether to ring the doorbell chime. Additionally, the ASD system 501 may use GPS or Bluetooth information from a remote computing device 531 (e.g. user's wireless user device) to determine whether to operate the doorbell chime.

The ASD system 501 may be configured to communicate between the above local electronic devices 541 (e.g. security devices, smart thermostat, smart devices, or smart appliances) by sending and retrieving proximity information, schedule information, textual (e.g. email, SMS, MMS, text, etc.), visual, motion, or audio information, as well as user access information shared between electronic devices. For example, the ASD system 501 may be configured to be notified by these smart devices of exterior weather conditions, vehicle or user location, pedestrians, air quality, allergens/pollen, peak hours, etc. Notification may be made through text, email, visual, or audio information provided by remote computing devices 531, server 511, and/or local electronic devices 541 or any other electronic device mentioned above. Once a smart device (e.g. security camera 541) detects an individual, environmental activity may be relayed to the ASD system 501, then to a server 511 or remote computing device 531 for requesting or determining an appropriate response.

In this way, the ASD system 501 acts as a hub for collecting and processing environmental activity from other electronic devices then prompting the server 511 or remote computing device 531 for control instructions to play a digital or analog chime, ring the manual doorbell chime 140, or collect environmental activity (e.g. video, audio, temperature, etc.,) to send to a computing device (e.g. doorbell module 401, local electronic devices 541, remote, computing devices 531, server 511, etc.,). The ASD system 501 may also operate local electronic devices 541 based on user conditions or preferences. For example, if the user is opening the garage door 160 through garage door controller and monitoring unit 150 to park their vehicle, the ASD system 501 may prevent the doorbell chime from ringing and the smart lock on the entry door 101 from opening the front door. However, the ASD system 501 may first prompt a user or user(s) before enabling such functionality.

The ASD system 501 may be communicatively coupled to and controlled, programmed, or reprogrammed by local electronic devices 541 in building 100, remote computing devices 531, or by one or more servers 511 to collect such data or collect additional data. For example, a garage door controller and monitoring device 150 located in building 100 may be used to control the ASD system 501 to ring doorbell chime 140 when a garage door 160 is opened, or to ring doorbell chime 140 when a user's vehicle is within a proximity (e.g. 100 feet) of building 100 and heading towards the front of the garage door 160.

The ASD system 501 may also include a key fob 503 that a user may carry to operate local electronic devices 541 (e.g. smart lock, or entry point devices 260) or to prevent ringing the digital doorbell chime of the Smart Doorbell 121 and doorbell chime 140. In some exemplary embodiments, the key fob 503 may be a RFID card or RFID device that may be attached to a remote computing device 531. In some exemplary embodiments, the ASD system 501 may be programmed by the user to respond to the key fob 503 based on a schedule, geo-location of a user, user preferences, etc. Responses may include any combination of, ringing the digital doorbell chime of the Smart Doorbell 121, doorbell chime 140, operating entry point devices 260, operating local electronic device 541, and the like.

In some exemplary embodiments, the ASD system 501 may take a snapshot of the individual, processes facial features of the individual, and creates a digital photo id, digital access id, or the like, for imprinting on an access card, key card, or key fob. The access id may be a physical type of id (e.g. key fob) or a digital type of id (e.g. access through facial recognition). The building 100 may have an entry point device 260 (smart lock) that accepts key fobs or access cards created by the ASD system 501. In this way, the ASD system 501 may create physical access cards for entering through entry door 101 or garage 160. A miniature or portable priming device may be attached, or built into the ASD system 501 for printing the snapshot of the individual to create the access card, key fob, or key card. To have access to the building 100, the individual may, for example, download an APP for the ASD system 501 or receive permission to access and download the APP through a text or email message. The individual may then provide personal information, for example, phone number, name, email, address, date of birth, driver license, social security number, etc., to verify their identity and receive authorization to access the building 100. Upon providing the personal information and receiving authorization, the ASD system 501 may verify the identity of the individual by taking a snapshot and sending a verification code to their remote computing device 531.

The ASD system 501 may use a shared IP or dedicated IP. The ASD system 501 having a fixed or static IP may benefit from numerous advantages, such as but not limited to, less downtime or power consumption from IP address refreshes, Private SSL Certificate, Anonymous FTP, Remote access, and access when the domain name is inaccessible.

The ASD system 501 may further be communicably coupled to one or more door sensors and window sensors. The door sensors and window sensors may notify the ASD system 501 in the event of a window or door opening, the ASD system 501 may then turn on and begin capturing audio and video of the event and concurrently or subsequently notify one or more local electronic devices 541, remote computing devices 531, servers 511, etc.

FIGS. 6A-6B illustrate a first exemplary method 600A and 600B of using the ASD system 501 in accordance with one car more embodiments of the present disclosure. Method may apply to other exemplary embodiments of the ASD device as disclosed in FIGS. 1-4. Method 600A may be used independently or in combination with method 600B for operating one or More computing devices, smart devices, or other electronic devices or components. For explanatory purposes, the example process 600A and 600B are described herein with reference to wireless user device 280, ASD system 501 (doorbell module 401, and Smart Doorbell 401) of FIGS. 1 and 4-5 however, the example process 600A and 600B is not limited to wireless user device 280, and ASD system 501, and the example process 600A and 600B may be perforated by one or more computing devices, smart devices, or other electronic devices or components shown in FIGS. 1-5. Further for explanatory purposes, the blocks of the example process 600A and 600B are described herein as occurring in serial, or linearly. However, multiple blocks of the example process 600A and 600B may occur in parallel. In addition, the blocks of the example process 600A and 600B may be performed a different order than the order shown and/or one or more of the blocks of the example process 600A and 600B may not be performed. Further, any or all blocks of example process 600A and 600B may further be combined and done in parallel, in order, or out of order. The blocks of process 600A may be mixed with the blocks of process 600B.

Each block shown in FIG. 6A represents one or more processes, methods or subroutines, carried out in the exemplary method FIGS. 1-5 show exemplary embodiments of carrying out the methods of FIG. 6A for detecting, collecting, processing, and transmitting information. The exemplary method may begin at block 601.

Referring to FIG. 6A, the exemplary method of using the ASD system 501 begins with detecting a first, activity (e.g. one or more environmental activity and/or environmental conditions) in a first zone (e.g. first zone 123) at block 601 (e.g. collecting individual activity and/or ambient lighting), followed by block 603 of performing a first action of collecting, for example, visual information and audio information of the first activity by the ASD system 501, one or more servers 511, electronic devices 541, remote computing devices 531, defined by the user, or any combination thereof. The first activity and all subsequent activities may be collected and stored on one or more storage device (e.g. locally accessibly storage 502 or remotely accessibly storage 512).

The first activity and all subsequent activities may be collected, streamed or broadcast, and/or recorded at any time (e.g. concurrently with, prior to, or after any block) in process 600A or process 600B. Moreover, at any time (e.g. concurrently with, prior to, or after any block) in process 600A or 600B, the states may be collected, stored, updated or allocated within a database of the ASD system 501, one or more servers 511, electronic devices 541, remote computing devices 531, defined by the user, or any combination thereof.

The process is followed by block 605 of sending a notification alert and information about the first activity (e.g. visual information, audio information, etc.,) to one or more servers 511, electronic devices 541, or remote computing devices 531, or any combination thereof.

The process is followed by detecting a second activity (e.g. one or more, environmental activity and/or environmental conditions) in a second zone (e.g. second zone 125) at block 607 (e.g. collecting individual activity and/or ambient lighting), followed by block 609 of performing a second action when the second activity occurs consecutive to the first activity and within a predetermined amount of time.

The second action being one or more of ringing a doorbell chime 140, sending a notification to a remote computing device 531, sending visual information or sending audio information.

In process 600A and 600B the first zone and the second zone may be generated by the ASD system 501, one or more servers 511, electronic devices 541, or remote computing devices 531, defined by the user, or any combination thereof. Moreover, in process 600A and 600B, one or more sensors front the ASD system 501, electronic devices 541, or remote computing devices 531, may be used to collect, for example, audio information, visual information, and environmental information to enable image or voice recognition technology. The sensors may be one or more of a speaker, a. microphone, camera, or a motion sensor, temperature sensor, humidity sensor, and wind sensor. The sensitivity of the sensors may be adjusted (or accounted for) to discriminate between the presence of a human being and other living beings in the first zone and the second zone.

In the process 600A and 600B the visual and audio information may be analyzed prior to executing the second action. For example, the visual and audio information may be analyzed by the ASD system 501, electronic devices 541, or remote computing devices 531 to determine if the activity involves human beings or other living beings prior to performing process of block 605 or block 607.

Each block shown in FIG. 6B represents one or more processes, methods or subroutines, carried out in the exemplary method. FIGS. 1-5 show exemplary embodiments of carrying out the methods of FIG. 6B for detecting, collecting, processing, and transmitting information. The exemplary method may begin at block 601.

Referring to FIG. 4B, the exemplary method of using the ASD system 501 begins with detecting one or more environmental activity and/or environmental conditions (hereinafter "states") in a first zone (e.g. first zone 123) at block 621 (e.g. collecting individual activity and/or ambient lighting), followed by block 623 of recording the one or more states by the ASD system 501, one or more servers 511, electronic devices 541, or remote computing devices 531, or any combination thereof, on one or more storage device (e.g. locally accessibly storage 502 or remotely accessibly storage 512).

The process is followed by block 625 of collecting one or more other states (e.g. collecting temperature and humidity) by the ASD system 501 from the first zone 123. States may be collected, streamed or broadcast, and/or recorded at any time (e.g. concurrently with, prior to, or after any block) in process 600B. Moreover, at any time (e.g. concurrently with, prior to, or after any block) in process 600B, the states may be collected, stored, updated or allocated within a database of the ASD system 501, one or more servers 511, electronic devices 541, or remote computing devices 531, or any combination thereof.

In block 627, any of the states from blocks 621-625 above may be transmitted by the ASD system 501 to one or more servers electronic devices, and/or remote computing devices. States may be transmitted at any time (e.g. concurrently with, prior to, or after any block) in process 600B.

In block 629, the ASD system 501 detects one or more states in a second zone (e.g. second zone 125). As above, the, states in second zone 125 (or various other zones) may be recorded, collected, streamed or broadcast, or stored on one or more storage device (e.g. locally accessibly storage 502 or remotely accessibly storage 512), or any combination thereof, at any time (e.g. concurrently with, prior to, or after any block). The states may be collected, stored, updated or allocated within a database of the ASD system 501, one or more servers 511, electronic devices 541, or remote computing devices 531, or any combination thereof.

In block 631, the ASD system 501 play an internal chime, message, greeting, or recording through speaker 451. The ASD, system 501 may also send a control signal to a doorbell chime 140 (e.g. digital or analog doorbell chime) to ring a bell or play a recording.

In block 633, the ASD system 501 may notify (e.g. by text, voice, animation, clip, or video as disclosed in FIGS. 3A-3C) and/or request further action (as disclosed in FIGS. 3A-3C) one or more servers 511, electronic devices 541, or remote computing devices 531, or any combination thereof.

In block 635, the ASD system 501 and/or one or more servers 511 may provide a live view, live broadcast, or live stream of the states (as disclosed in FIGS. 3A-3C) to one or more electronic devices 541, or remote computing devices 531, or any combination thereof.

In block 637, the ASD system 501 and/or one or more servers 511 may provide a recording of the states (as disclosed in FIGS. 3A-3C) to one or more electronic devices 541, or remote computing devices 531, or any combination thereof.

A remote computing device may be a smart device, a smart phone, a vehicle, a tablet, a laptop, a TV, or any electronic device capable of wirelessly connecting to a network or joining a wireless network. The remote computing device may be wirelessly and communicably associated to an individual either through a network or server (e.g. through a user account on the server, or WiFi™ login information), or through visual information collected by the SRV device. The terms remote computing device, individual, and user may be used interchangeably throughout the present disclosure.

The server may be a computer that provides data to other computers. It may serve data to systems on a local area network (LAN) or a wide area network (WAN) over the Internet. The server may comprise of one or more types of servers (e.g. a web server or file server), each running its own software specific to the purpose of the server for sharing services, data, or ides over a network. The server may be any computer configured to act as a server (e.g. a desktop computer, or single or multiple rack-mountable servers) and accessible remotely using remote access software.

Proximity determination may be made, by using a combination of visual, motion, and, audio information. The sensor components or sensor modules, server, remote computing device, and/or ASD system (Smart Doorbell and/or doorbell module) may defined a virtual perimeter for a real-world geographic area. The ASD system may also respond to geofencing triggers. Geofencing may be accomplished using location aware devices through, for example, GPS, RFID technology, wireless network connection information, cellular network connection information, etc. Visual, motion, and audio information may be collected by the ASD system or server to substantiate an individual(s)/remote computing device(s) physical location.

The network may be a network of computers, a local area network (LAN), a wide area network (WAN), or an Intranet, or a network of networks, for example, the Internet. Moreover, various interfaces may be used to connect to the network such as cellular interfaces, WiFi™ interfaces, Infrared interfaces, RFID interfaces, ZigBee interfaces, Bluetooth interfaces, Ethernet interfaces, coaxial interfaces, optical interfaces, or generally any communication interface that may be used for device communication. The purpose of the network is to enable the sharing of files and information between multiple systems.

The term "within a proximity", "a vicinity", "within a vicinity", "within a predetermined distance", and the like may be defined between about 10 meters and about 2000 meters. The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but may have one or more deviations from a true cylinder. The term "comprising," when utilized, means "including, but not necessarily limited to"; it specifically indicates open-ended inclusion or membership in the so-described combination, group, series and the like.

The term "a predefined distance" may be defined as the distance of an approaching individual as the individual, nears one or more ASD systems, or a traceable object used in determining environmental features and/or conditions. The predefined distance may be defined as between about 1 meter and about 2000 meters.

The terms "predefined" or "predetermined" period of time may be defined to be between about 0.5 second to about 10 minutes.

The processor of the ASD system, remoting computing device, or server may perform an action (e.g. first, second, third, etc.,) comprising of a single action, set of actions, or a list or blend of actions based on, one or more of: a proximity of an individual(s) or remote computing device(s), a time of day, environmental activity and/or environmental features, visual, motion, or audio information, a schedule, user(s) preferences, and the state and settings of entry point devices, ASD system, and local electronic devices, as described above. The action may be any one of locking/unlocking the smart lock, operating smart lights, fully or partially opening one or more garage doors, ringing a digital smart doorbell chime, ringing a manual in-building mechanical or digital doorbell chime, operating a thermostat, smart TV, or other local electronic devices. The action may also include playing a music file, sound file, greeting, or message in response to a detected change in occupancy and/or environmental conditions and/or features, or in response to a detected or defined audio, proximity, visual, or motion trigger. The action may also comprise of controlling other smart devices as communicated through the ASD system or server, for example, turning on a ceiling fan, outlet, and communicating with remote computing device(s) or detected individual(s). The action may also comprise of sending an email, text, or SMS to a server, smart devices, or remote computing device(s).

Those of skill in the art will appreciate that the foregoing disclosed systems and functionalities may be designed and configured into computer files (e.g. RTL, GDSII, GERBER, etc.) stored on computer-readable media. Some or all such files may be provided to fabrication handlers who fabricate devices based on such files. Resulting products include semiconductor wafers that are separated into semiconductor dies and packaged into semiconductor chips. The semiconductor chips are then employed in devices, such as, an IoT system, the SRV device, or a combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc, read-only memory (CD-ROM), or any other form of non-transient storage medium known in the art. An exemplary storage medium is coupled to the processor such that the processor may read information from, and write information to, the storage medium. In the alternative, the storage medium may be, integral to the processor. The processor and the storage medium may reside in an application-specific integrated circuit (ASIC). The ASIC may reside in a computing device or a user terminal. In the alternative, the processor, and the storage medium may reside as discrete components in a computing device or user terminal.

Further, specific details are given in the description to provide a thorough understanding of the embodiments. However, embodiments may be practiced without these specific details. For example, well-known circuits, processes, algorithms, structures, and techniques have been shown without unnecessary detail to avoid obscuring the embodiments. This, description provides example embodiments only and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Where applicable, various embodiments provided by the present disclosure may be implemented using hardware, software, or combinations of hardware and software. In addition, where applicable, the various hardware components and/or software components, set forth herein, may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software or application, in accordance with the present disclosure, such as program code and/or data, may be stored on one or more computer-readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device. As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the present disclosure, the disclosure, the present disclosure, other variations thereof and alike are for convenience and do not imply that a disclosure relating to such phrase(s) is essential to the present disclosure or that such disclosure applies to all configurations of the present disclosure. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as, an example, instance, or illustration." Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

The embodiments shown and described above are only examples. Many details are often found in the art such as the other features of an image device. Therefore, many such details are neither shown nor described. Even though numerous characteristics and advantages of the present technology have been set forth the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed:

1. A doorbell device comprising:
    at least one memory;
    one or more sensors, for detecting a first activity within a first geographical zone and a second activity within a second geographical zone, wherein the first geographical zone is defined from a first distance from the doorbell device and the second geographical zone is defined from a second distance from the doorbell device and wherein the second geographical zone overlaps the first geographical zone;
    a processor, coupled to the at least one memory, the processor is configured to cause:
    a first action upon detecting the first activity within the first geographical zone;

wherein the first action comprises of acquiring at least one of a visual information, an audio information, or both from a surrounding environment, wherein the first action continues acquiring the visual information, the audio information, or both from the surrounding environment only when the second activity is triggered within a predetermined amount of time;

a second action of playing a doorbell chime upon detecting the second activity within the second geographical zone;

wherein the second activity occurs within an elapsed time from the first activity; and wherein the second action occurs when the second activity occurs consecutive to the first activity within a predetermined amount of time;

wherein the first and second actions are performed when the first activity is followed by the second activity within a predetermined amount of time;

wherein the first action is performed when the second activity occurs prior to the first activity; and wherein at least one of a user preference or behavior is evaluated, or the user is prompted to perform the first or second action when the first activity occurs prior to the second activity or when the second activity does not occur within a predetermined amount of time.

2. The doorbell device of claim 1, further comprising a network module coupling the doorbell device to a local area network wherein the doorbell device is communicably coupled to at least one of a remote computing device or a server.

3. The doorbell device of claim 2, wherein the second action further includes at least one of sending a notification to a remote computing device, sending the visual information, sending the audio information, or both, from the surrounding environment.

4. The doorbell device of claim 2, wherein the first geographical zone and the second geographical zone are generated by the doorbell device or defined by a user.

5. The doorbell device of claim 1, wherein the first activity and the second activity include the presence of one or more sensed activity detected by the one or more sensors.

6. The doorbell device of claim 1, wherein the one or more sensors is one of a speaker, a microphone, a camera, or a motion sensor, temperature sensor, humidity sensor, and wind sensor, and wherein the one or more sensors enable image recognition technology or voice recognition technology.

7. The doorbell device of claim 2, wherein the first action comprises of collecting at least one of the visual information, the audio information, or both, from the surrounding environment within the first geographical zone and the second geographical zone.

8. The doorbell device of claim 7, wherein following the first action the ASD device sends a notification alert, at least one of the visual information, the audio information, or both from the surrounding environment to the remote computing device.

9. The doorbell device of claim 8, wherein at least one of the visual information, the audio information, or both, from the surrounding environment are analyzed prior to executing the second action.

10. The doorbell device of claim 9, wherein the visual information and the audio information enables facial recognition technology and voice recognition technology.

11. The doorbell device of claim 10, wherein a combination of facial recognition technology, voice recognition technology and an ability to adjust the sensitivity of the one or more sensors enables the doorbell device to discriminate between the presence of a human being and other living beings in the first geographical zone and the second geographical zone and wherein the discrimination determines the occurrence of the second action.

12. A method comprising:
detecting, by doorbell device, a first activity within a first geographical zone and responsive to the detecting of the first activity performing a first action;

wherein the first action comprises of acquiring at least one of a visual information, an audio information, or both from a surrounding environment, wherein the first action continues acquiring the visual information, the audio information, or both from the surrounding environment only when the second activity is triggered within a predetermined amount of time;

detecting, by the doorbell device, a second activity within a second geographical zone and responsive to the detecting of the second activity performing a second action;

wherein the first geographical zone is defined from a first distance from the ASD or a physical door and the second geographical zone is defined from a second distance from the doorbell device or a physical door and wherein the second geographical zone overlaps the first geographical zone;

wherein the second activity occurs within an elapsed time from the first activity; and wherein the second action occurs when the second activity occurs consecutive to the first activity within a predetermined amount of time; and wherein the doorbell device performs the second action and the first action only when the second activity follow the first activity within a predetermined amount of time; and wherein the doorbell device performs the first action when the second activity occurs prior to the first activity; and wherein at least one of a user preference or behavior is evaluated, or the user is prompted to perform the first or second action when the first activity occurs prior to the second activity or when the second activity does not occur within a predetermined amount of time.

13. The method of claim 12, wherein the second action is one of playing a doorbell chime, sending a notification to a remote computing device, sending the visual information, sending the audio information, or both, from the surrounding environment.

14. The method of claim 12, wherein the first geographical zone and the second geographical zone are generated by the doorbell device or defined by a user.

15. The method of claim 12, wherein the first activity and the second activity includes the presence of one or more sensed activity detected by the one or more sensors.

16. The method of claim 12, wherein the doorbell device comprises one or more sensors and wherein the one or more sensors is one of a speaker, a microphone, a camera, or a motion sensor, temperature sensor, humidity sensor, and wind sensor, and wherein the one or more sensors enable image recognition technology or voice recognition technology.

17. The method of claim 12, wherein the first action comprises of collecting at least one of the visual information, the audio information, or both, from the surrounding environment within the first geographical zone and the second geographical zone.

18. The method of claim 12, wherein following the first action the doorbell device sends a notification alert, at least of the visual information, the audio information, or both, from the surrounding environment to the remote computing device.

19. The method of claim 18, wherein at least one of the visual information, the audio information, or both, from the surrounding environment are analyzed prior to executing the second action.

20. The method of claim 19, wherein the visual information and the audio information enables facial recognition technology and voice recognition technology.

21. The method of claim 20, wherein a combination of facial recognition technology, voice recognition technology and an ability to adjust the sensitivity of the one or more sensors enables the doorbell device to discriminate between the presence of a human being and other living beings in the first geographical zone and the second geographical zone and wherein the discrimination determines the occurrence of the second action.

22. A non-transitory machine-readable medium comprising instructions stored therein, which, when executed by one or more processors of a processing system cause the one or more processors to perform operations comprising:
  detecting, by doorbell device, a first activity within a first geographical zone and responsive to the detecting of the first activity performing a first action;
  detecting, by the doorbell device, a second activity within a second geographical zone and responsive to the detecting of the second activity performing a second action;
  wherein the first geographical zone is defined from a first distance from the ASD or a physical door and the second geographical zone is defined from a second distance from the doorbell device or a physical door and wherein the second geographical zone overlaps the first geographical zone;
  wherein the second activity occurs within an elapsed time from the first activity; and
  wherein the second action occurs when the second activity occurs consecutive to the first activity within a predetermined amount of time; and
  wherein the doorbell device performs the second action and the first action only when the second activity follow the first activity within a predetermined amount of time; and
  wherein the doorbell device performs the first action when the second activity occurs prior to the first activity; and
  wherein at least one of a user preference or behavior is evaluated, or the user is prompted to perform the first or second action when the first activity occurs prior to the second activity or when the second activity does not occur within a predetermined amount of time.

23. The non-transitory machine-readable medium of claim 22, wherein the second action is one of playing a doorbell chime, sending a notification to a remote computing device, sending the visual information, sending the audio information, or both, from the surrounding environment.

24. The non-transitory machine-readable medium of claim 22, wherein the first geographical zone and the second geographical zone are automatically generated by the doorbell device or defined by a user.

25. The non-transitory machine-readable medium of claim 22, wherein the first activity and the second activity includes the presence of one or more sensed activity detected by the one or more sensors.

26. The non-transitory machine-readable medium of claim 22, wherein the doorbell device comprises one or more sensors and wherein the one or more sensors is one of a speaker, a microphone, a camera, or a motion sensor, temperature sensor, humidity sensor, and wind sensor, and wherein the one or more sensors enable image recognition technology or voice recognition technology.

27. The non-transitory machine-readable medium of claim 22, wherein the first action comprises of collecting at least one of the visual information, the audio information, or both, from the surrounding environment within the first geographical zone and the second geographical zone.

28. The non-transitory machine-readable medium of claim 22, wherein following the first action the doorbell device sends a notification alert, at least one of the visual information, the audio information, or both, from the surrounding environment to the remote computing device.

29. The non-transitory machine-readable medium of claim 28, wherein at least one of the visual information, the audio information, or both, from the surrounding environment are analyzed prior to executing the second action.

30. The non-transitory machine-readable medium of claim 29, wherein the visual information and the audio information enables facial recognition technology and voice recognition technology.

* * * * *